(12) United States Patent
Makeev et al.

(10) Patent No.: US 12,190,427 B2
(45) Date of Patent: Jan. 7, 2025

(54) HIDDEN SURFACE REMOVAL FOR LAYERED CLOTHING FOR AN AVATAR BODY

(71) Applicant: Roblox Corporation, San Mateo, CA (US)

(72) Inventors: Sergei Makeev, Foster City, CA (US); Byungmoon Kim, San Jose, CA (US); Si Chen, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 17/965,213

(22) Filed: Oct. 13, 2022

(65) Prior Publication Data

US 2023/0124297 A1   Apr. 20, 2023

Related U.S. Application Data

(60) Provisional application No. 63/404,925, filed on Sep. 8, 2022, provisional application No. 63/255,489, filed on Oct. 14, 2021.

(51) Int. Cl.
*G06T 13/40* (2011.01)
*G06T 19/20* (2011.01)

(52) U.S. Cl.
CPC ............. *G06T 13/40* (2013.01); *G06T 19/20* (2013.01); *G06T 2210/16* (2013.01)

(58) Field of Classification Search
CPC .......................... G06T 2210/16; G06T 15/40
See application file for complete search history.

(56) References Cited

U.S. PATENT DOCUMENTS

| 11,321,916 B1 | 5/2022 | Zhang et al. |
| 2007/0273711 A1 | 11/2007 | Maffei |

(Continued)

FOREIGN PATENT DOCUMENTS

| EP | 3 029 635 | 6/2016 |
| JP | 2016-110652 | 6/2016 |
| KR | 10-2019-0070884 | 6/2019 |

OTHER PUBLICATIONS

USPTO, Written Opinion for International Patent Application No. PCT/US2022/046523, Feb. 8, 2023, 11 pages.

(Continued)

*Primary Examiner* — Samantha (Yuehan) Wang
(74) *Attorney, Agent, or Firm* — IP Spring

(57) ABSTRACT

An automated cage-to-cage fitting technique is used to fit three-dimensional (3D) geometry to target 3D geometry for 3D avatars in a 3D environment, such as an online game. Each graphical representation of items of clothing is provided with an inner cage and an outer cage. The inner cage of a clothing item (a current layer) is mapped to the outer cage of another clothing item (a previous/underlying layer) that has been fitted on the 3D avatar. This mapping enables the current layer to conform to the shape of the previous layer. The technique allows any body geometry to be fitted with any clothing geometry, including enabling layers of clothing to be fitted over underlying layer(s). Hidden surface removal (HSR) operations may be performed to identify surfaces of an underlying layer that are hidden by an overlying layer, and such hidden surfaces are not rendered.

20 Claims, 14 Drawing Sheets

(56) References Cited

U.S. PATENT DOCUMENTS

| | | |
|---|---|---|
| 2010/0321386 A1 | 12/2010 | Lin et al. |
| 2013/0034276 A1 | 2/2013 | Hibbard |
| 2013/0057544 A1 | 3/2013 | Oh |
| 2014/0267268 A1 | 9/2014 | Tipton |
| 2015/0029198 A1 | 1/2015 | Sumner et al. |
| 2016/0171296 A1* | 6/2016 | Ikenoue ............... G06V 10/752 382/103 |
| 2016/0284018 A1 | 9/2016 | Adeyoola et al. |
| 2016/0379419 A1 | 12/2016 | Khalili et al. |
| 2017/0032579 A1 | 2/2017 | Eisemann et al. |
| 2017/0161948 A1 | 6/2017 | Hua et al. |
| 2018/0315254 A1 | 11/2018 | Grant et al. |
| 2019/0088033 A1 | 3/2019 | Kuchibotla et al. |
| 2019/0362529 A1 | 11/2019 | Wedig et al. |
| 2019/0371080 A1* | 12/2019 | Sminchisescu ......... G06T 17/20 |
| 2020/0035010 A1 | 1/2020 | Kim et al. |
| 2021/0082179 A1* | 3/2021 | Fedyukov ................. G06T 7/60 |
| 2021/0150806 A1 | 5/2021 | Guler et al. |
| 2021/0224765 A1* | 7/2021 | Siddique ................. G06F 16/95 |
| 2022/0292791 A1 | 9/2022 | Makeev et al. |

OTHER PUBLICATIONS

USPTO, International Search Report for International Patent Application No. PCT/US2022/046523, Feb. 8, 2023, 2 pages.

"APB: Creating a Powerful Customisation System for a Persistent Online Action Game", Retrieved from Internet: https://macropolygon.files.wordpress.com/2010/08/apb_customisation_gdc2010.pptx, 2010, 49 pages.

"RBF Character Conversion", Retrieved from Internet: http://www.polygon.me/2018/08/rbf-character-conversion.html, Aug. 9, 2018, 3 pages.

Agafonkin, "Edgebreaker, the heart of Google Draco", Retrieved from Internet: https://observablehq.com/@mourner/edgebreaker-the-heart-of-google-draco, Oct. 16, 2019, 9 pages.

Anjyo, et al., "Scattered Data Interpolation for Computer Games", SIGGRAPH 2014 Course Notes, 2014, 69 pages.

Appleby, et al., "Punching Above Your Weight: Small Art Teams, Big Games", Video; retrieved from Internet: https://www.gdcvault.com/play/1014359/Punching-Above-Your-Weight-Small, 2011, 4 pages.

Bailey, et al., "Fast and deep deformation approximations", ACM Transactions on Graphics, vol. 37, Issue 4, Aug. 2018, 12 pages.

Barak, "Adaptive Clothing System in Kingdom Come: Deliverance", Retrieved from Internet: https://www.gdcvault.com/play/1022822/Adaptive-Clothing-System-in-Kingdom; see also video at: https://www.gdcvault.com/play/1022771/Adaptive-Clothing-System-in-Kingdom, 2015, 39 pages.

Botsch, et al., "Real-Time Shape Editing using Radial Basis Functions", Eurographics 2005, vol. 24, No. 3, 2005, 11 pages.

De Goes, et al., "Mesh Wrap based on Affine-Invariant Coordinates", ACM SIGGRAPH 2019 Talks, 2019, 2 pages.

Desbrun, et al., "Implicit Fairing of Irregular Meshes using Diffusion and Curvature Flow", SIGGRAPH '99: Proceedings of the 26th Annual Conference on Computer Graphics and Interactive Techniques, Jul. 1999, 8 pages.

Feng, et al., "Avatar Reshaping and Automatic Rigging Using a Deformable Model", Proceedings of the 8th ACM SIGGRAPH Conference on Motion in Games, 2015, 8 pages.

Fortier, "Universal Character System in Saints Row 2", Video; retrieved from Internet: https://www.gdcvault.com/play/1289/Universal-Character-System-in-SAINTS, 2009, 3 pages.

Gagliardi, et al., "A Two-Step Mesh Adaption Tool Based on RBF with application to Turbomachinery Optimization Loops", Evolutionary and Deterministic Methods for Design Optimization and Control With Applications to Industrial and Societal Problems. Springer, Cham, 2019, pp. 127-141.

Godard, "Plugin and Nodal Demo Reel 2016", Video; retrieved from Internet: https://vimeo.com/166291982#t=3m33s, 2016, 3 pages.

Kim, et al., "GeoFilter: Geometric Selection of Mesh Filter Parameters", Eurographics, Computer Graphics Forum, available at https://faculty.cc.gatech.edu/~jarek/papers/GeoFilter.pdf, Jan. 31, 2005, 8 pages.

Lalleve, et al., "Character Pipeline and Customization System for 'Far Cry Primal'", Retrieved from Internet: https://www.gdcvault.com/play/1024578/Character-Pipeline-and-Customization-System, 2017, 104 pages.

Li, et al., "Fitting 3D garment models onto individual human models", Computers and Graphics 34, 2010, pp. 742-755.

Nair, "Innovations in The Sims 4 Character Creator", Retrieved from Internet: https://www.gdcvault.com/play/1022086/Innovations-in-The-Sims-4, 2015, 89 pages.

Niu, et al., "Radial basis function mesh deformation based on dynamic control points", Aerospace Science and Technology 64; retrieved from Internet: https://dacemirror.sci-hub.tw/journal-article/b485b3a622b0953d5a8c898a5a6cc563/niu2017.pdf (Abstract), 2017, pp. 122-132.

Rossignac, "Edgebreaker: Connectivity compression for triangle meshes", GVU Technical Report GIT-GVU-98-35, IEEE Transactions on Visualization and Computer Graphics, Jan.-Mar. 1999, 15 pages.

Schiffmann, "RBF Interpolation for Mesh Deformation", Retrieved from Internet: https://imsc.uni-graz.at/haasegu/Lectures/GPU_CUDA/WS16/2016-11-03-HPC1-Schiffmann-RBF.pdf, 2016, 12 pages.

Selim MM, et al., "Mesh Deformation Approaches—A Survey", J. Phys. Math., vol. 7, Issue 2, 2016, 9 pages.

Shepherd, "Building Customizable Characters for Bungie's Destiny", Video; retrieved from Internet: https://www.gdcvault.com/play/1020412/Building-Customizable-Characters-for-Bungie, 2014, 4 pages.

Stokan, "Ultimate Customization in Character Creation—Challenges and Innovations", Video; retrieved from Internet: https://www.gdcvault.com/play/1014370/Ultimate-Customization-in-Character-Creation, 2011, 4 pages.

Taubin, "A Signal Processing Approach to Fair Surface Design", SIGGRAPH '95: Proceedings of the 22nd Annual Conference on Computer Graphics and Interactive Techniques, Sep. 1995, 8 pages.

Torok, et al., "REDengine 3 Character Pipeline", Retrieved from Internet: http://fileserv.polter.pl/1594-CDPRED_SIGGRAPH.pdf, 2013, 53 pages.

USPTO, Written Opinion for International Patent Application No. PCT/US2022/015246, May 11, 2022, 12 pages.

USPTO, International Search Report for International Patent Application No. PCT/US2022/015246, May 11, 2022, 2 pages.

USPTO, Non-final Office Action for U.S. Appl. No. 17/375,066, May 24, 2022, 15 pages.

USPTO, Notice of Allowance for U.S. Appl. No. 17/375,066, Nov. 8, 2022, 9 pages.

Vaisse, "Ubisoft Cloth Simulation: Performance Postmortem and Journey from C++ to Computer Shaders", Retrieved from Internet: https://www.gdcvault.com/play/1022421/Ubisoft-Cloth-Simulation-Performance-Postmortem, 2015, 97 pages.

Wang, et al., "Delaunay graph-based moving mesh method with damping functions", Chinese Journal of Aeronautics, vol. 31, Issue 11, Nov. 2018, pp. 2093-2103.

Wang, et al., "Mesh deformation on 3D complex configurations using multistep radial basis functions interpolation", Chinese Journal of Aeronautics, 31(4), 2018, pp. 660-671.

USPTO, International Search Report for International Patent Application No. PCT/US2022/046528, Jan. 31, 2023, 2 pages.

USPTO, Written Opinion for International Patent Application No. PCT/US2022/046528, Jan. 31, 2023, 6 pages.

"Japanese Office Action in JP Application No. 2023-556822", Sep. 9, 2024, 12 Pages.

* cited by examiner

HIDDEN SURFACE REMOVAL FOR LAYERED CLOTHING FOR AN AVATAR BODY

CROSS-REFERENCE TO RELATED APPLICATIONS

This application is a non-provisional application that claims priority under 35 U.S.C. § 119 (e) to U.S. Provisional Patent Application No. 63/255,489, filed on Oct. 14, 2021 and to U.S. Provisional Patent Application No. 63/404,925, filed on Sep. 8, 2022, both of which are incorporated herein by reference in their entireties.

TECHNICAL FIELD

This disclosure relates generally to computer graphics, and more particularly but not exclusively, relates to methods, systems, and computer readable media to provide graphical representations of layered clothing over an underlying graphical object, such as layered clothing for three-dimensional (3D) avatars in an electronic game, a virtual experience, or other 3D environment.

BACKGROUND

Multi-user electronic gaming or virtual experience environments typically involve the use of avatars, which represent the players in an electronic game. Different three-dimensional (3D) avatars differ in geometry/shapes from one avatar to another. For example, avatars may have different body shapes (e.g., tall, short, muscular, thin, male, female, human, animal, alien, etc.), number and types of limbs, etc. and are customizable with multiple pieces clothing and/or accessories worn by the avatar (e.g., shirt worn over the torso, jacket worn over the shirt, scarf worn over the jacket, hat worn over the head, etc.).

It can be difficult to obtain satisfactory visual results, in a computationally efficient manner, when layering pieces of clothing onto an avatar.

SUMMARY

According to a first aspect, a computer-implemented method provides layered clothing on three-dimensional (3D) avatars. The method includes:
  identifying body feature points of a body cage of a 3D avatar having an avatar body;
  mapping inner feature points, of an inner cage of a first piece of clothing, to the body feature points of the body cage to obtain a deformed first piece of clothing that conforms to the avatar body;
  performing first hidden surface removal (HSR) operations to identify faces of the body cage that are hidden by the deformed first piece of clothing;
  fitting the deformed first piece of clothing onto the avatar body by at least partially enveloping the avatar body with the deformed first piece of clothing, wherein faces of the avatar body that correspond to the identified faces of the body cage are not rendered;
  mapping inner feature points, of an inner cage of a second piece of clothing, to outer feature points of an outer cage of the deformed first piece of clothing to obtain a deformed second piece of clothing that conforms to the outer cage of the first piece of clothing;
  performing second HSR operations to identify faces of the outer cage of the deformed first piece of clothing that are hidden by the deformed second piece of clothing; and
  fitting the deformed second piece of clothing onto the avatar body by at least partially enveloping the avatar body, having the deformed first piece of clothing fitted thereon, with the deformed second piece of clothing, wherein faces of the deformed first piece of clothing that correspond to the identified faces of the outer cage are not rendered.

According to another aspect, a non-transitory computer-readable medium is provided that has instructions stored thereon that, responsive to execution by a processor, cause the processor to perform or control performance of operations. The operations include:
  identify body feature points of a body cage of a 3D avatar having an avatar body;
  map inner feature points, of an inner cage of a first piece of clothing, to the body feature points of the body cage to obtain a deformed first piece of clothing that conforms to the avatar body;
  perform first hidden surface removal (HSR) operations to identify faces of the body cage that are hidden by the deformed first piece of clothing;
  fit the deformed first piece of clothing onto the avatar body by at least partially enveloping the avatar body with the deformed first piece of clothing, wherein faces of the avatar body that correspond to the identified faces of the body cage are not rendered;
  map inner feature points, of an inner cage of a second piece of clothing, to outer feature points of an outer cage of the deformed first piece of clothing to obtain a deformed second piece of clothing that conforms to the outer cage of the first piece of clothing;
  perform second HSR operations to identify faces of the outer cage of the deformed first piece of clothing that are hidden by the deformed second piece of clothing; and
  fit the deformed second piece of clothing onto the avatar body by at least partially enveloping the avatar body, having the deformed first piece of clothing fitted thereon, with the deformed second piece of clothing, wherein faces of the deformed first piece of clothing that correspond to the identified faces of the outer cage are not rendered.

According to still another aspect, an apparatus is provided that includes:
  a processor; and
  a non-transitory computer-readable medium coupled to the processor and having instructions stored thereon that, responsive to execution by the processor, cause the processor to perform or control performance of operations to:
    identify body feature points of a body cage of a 3D avatar having an avatar body;
    map inner feature points, of an inner cage of a first piece of clothing, to the body feature points of the body cage to obtain a deformed first piece of clothing that conforms to the avatar body;
    perform first hidden surface removal (HSR) operations to identify faces of the body cage that are hidden by the deformed first piece of clothing;
    fit the deformed first piece of clothing onto the avatar body by at least partially enveloping the avatar body with the deformed first piece of clothing, wherein faces of the avatar body that correspond to the identified faces of the body cage are not rendered;

map inner feature points, of an inner cage of a second piece of clothing, to outer feature points of an outer cage of the deformed first piece of clothing to obtain a deformed second piece of clothing that conforms to the outer cage of the first piece of clothing;

perform second HSR operations to identify faces of the outer cage of the deformed first piece of clothing that are hidden by the deformed second piece of clothing; and fit the deformed second piece of clothing onto the avatar body by at least partially enveloping the avatar body, having the deformed first piece of clothing fitted thereon, with the deformed second piece of clothing, wherein faces of the deformed first piece of clothing that correspond to the identified faces of the outer cage are not rendered.

DETAILED DESCRIPTION

Figure 2:
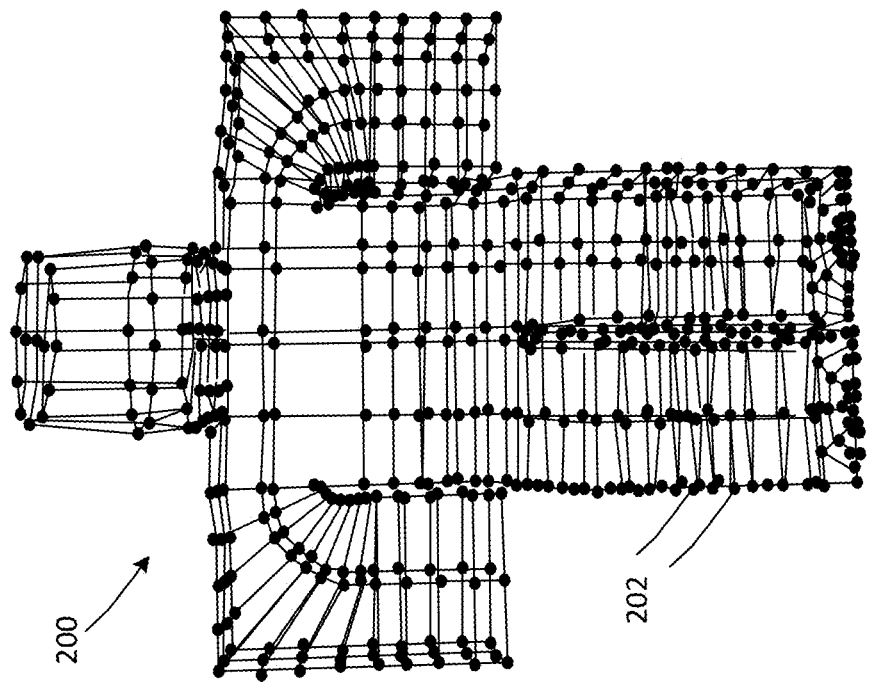
FIG. 2 shows another example body cage, in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "one embodiment", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure describes an automated cage-to-cage fitting technique for 3D avatars. The technique allows any body geometry to be fitted with any clothing geometry, including enabling layers of clothing to be fitted over underlying layer(s) of clothing, thereby providing customization without the limits imposed by pre-defined geometries, or requiring complex computations to make a clothing item compatible with arbitrary body shapes of avatars or other clothing items. The cage-to-cage fitting is also performed algorithmically by a gaming platform or gaming software (or other platform/software that operates to provide a 3D environment), without requiring avatar creators (also referred to as avatar body creators, or body creators) or clothing item creators to perform complex computations. The terms "clothing" or "piece of clothing" used herein are understood to include graphical representations of clothing and accessories, and any other item that can be placed on an avatar in relation to specific parts of an avatar cage.

When a piece of clothing is layered on top of an avatar's body part and/or on top of another piece of clothing, techniques for hidden surface removal (HSR) are disclosed herein. For example, for computational performance and aesthetic reasons, surfaces (of an underlying piece of clothing or body part), which are overlaid/covered by a particular piece of clothing, should not be rendered (e.g., made visible). HSR involves a process of identifying which surfaces (or parts thereof) cannot be seen from a particular viewing angle, and then performing rendering so that such surfaces are hidden (or are otherwise not rendered), thereby allowing the naturally viewable portions of the graphic (e.g., an avatar with clothing layered placed thereon) to be visible.

Purely for purposes of illustration and explanation, various embodiments are described herein in the context of 3D avatars that are used in a 3D game provided by a gaming platform. It is appreciated that such gaming environments are merely examples. Other embodiments of the cage-to-cage layering techniques described herein may be applied to other types of 3D environments, such as a virtual reality (VR) conference, a 3D session (e.g., an online lecture or other type of presentation involving 3D avatars), an augmented reality (AR) session, or in other types of 3D environments that may include one or more users that are represented in the 3D environment by one or more 3D avatars.

At runtime during a game or other 3D session, a player/user accesses a body library to select a particular avatar body, and accesses a clothing library to select pieces of clothing to place on the selected body. A 3D environment platform that presents avatars then implements the cage-to-cage fitting techniques to adjust (by suitable deformations, determined automatically) a piece of clothing to conform to the shape of the body, thereby automatically fitting the piece of clothing onto the body (and any intermediate layers, if worn by the avatar). When the piece of clothing is fitted over the body and/or underlying piece of clothing, HSR may be performed so that the hidden surfaces are not visible in the rendered result. The user can further select an additional piece of clothing to fit over an underlying piece of clothing, with the additional piece of clothing being deformed to match the geometry of the underlying piece of clothing.

The embodiments described herein are based on the concept of "cages" and "meshes." A body "mesh" (or "render mesh") is the actual visible geometry of an avatar. A body "mesh" includes graphical representations of body parts such as arms, legs, torso, head parts, etc. and can be of arbitrary shape, size, and geometric topology. Analogously, a clothing "mesh" (or "render mesh") can be any arbitrary mesh that graphically represents a piece of clothing, such as a shirt, pants, hat, shoes, etc. or parts thereof.

In comparison, a "cage" represents an envelope of features points around the avatar body that is simpler than the body mesh and has weak correspondence to the corresponding vertices of the body mesh. As will be explained in further detail later below, a cage may also be used to represent not only the set of feature points on an avatar body, but also a set of feature points on a piece of clothing.

Figure 1:
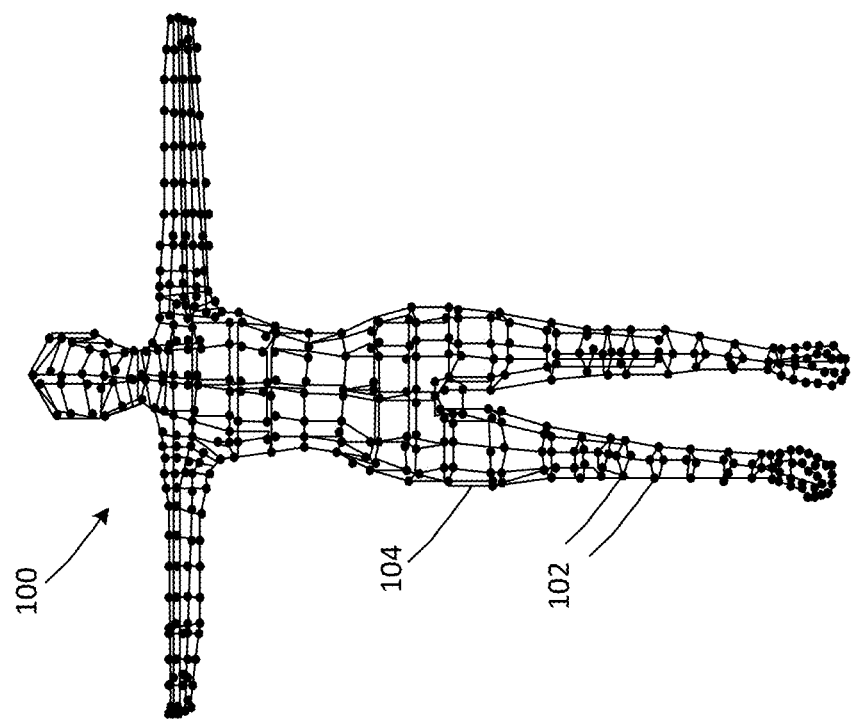
FIG. 1 shows an example body cage, in accordance with some embodiments.

FIG. 1 shows an example body cage 100, in accordance with some implementations. The body cage 100 in the example of FIG. 1 is an outer cage that envelopes or is superimposed on the external surface/contours of a humanoid body shape that acts as a mannequin. The underlying humanoid body shape (mannequin, not shown), which is enveloped by the body cage 100, may be represented by or comprised of a body mesh that includes multiple polygons and their vertices. The polygons of the body mesh (as well as those of a clothing mesh) may be triangles, with the surface area of each triangle providing a "face" or "mesh face."

The body cage 100 comprises a plurality of feature points 102 that define or otherwise identify or correspond to the shape of the mannequin. In some embodiments, the feature points 102 are formed by the vertices of segments/sides 104 of multiple polygons (or other geometric shape) on the mannequin. According to various embodiments (and although not depicted as such in FIG. 1), the polygons may be triangles, with the surface area of each triangle providing a "face" or "cage face." In some embodiments, the feature points 102 may be discrete points, without necessarily being formed by vertices of any polygons.

The body cage 100 of FIG. 1 provides an example of a low-resolution body cage with 642 feature points (or some other number of feature points) for a humanoid body geometry that excludes fingers. Other examples may use a body cage with 475 feature points. A body cage of a humanoid geometry that includes fingers might have 1164 feature points (or some other number of feature points), for example. Higher resolution body cages may include 2716 feature points (or some other number of feature points). These numbers (and ranges thereof) of feature points are just some examples—the number of feature points may vary from one implementation to another depending on factors such as desired resolution, processing capability of the 3D platform, user preferences, size/shape of the mannequin, etc.

Cages may be provided for any arbitrary avatar body shape or clothing shape. For instance, FIG. 2 shows another example body cage 200, in accordance with some embodiments. The body cage 200 in the example of FIG. 2 is an outer cage that envelopes or is superimposed on the external surface/contours of a body mesh of a generic gaming avatar body shape. Compared to the body cage 100 of FIG. 1, the body cage 200 of FIG. 2 may have the same number of feature points. In some embodiments, the body cage 200 may have a number of feature points that is different in number compared to the body cage 100, such as a fewer or greater number of feature points 202 as a consequence of a different (simpler or more complex) geometric shape of the gaming avatar and/or based on other factor(s). Thus, the number of feature points from one body cage to another may be selected as appropriate for different body shapes or other body properties.

Figure 3:
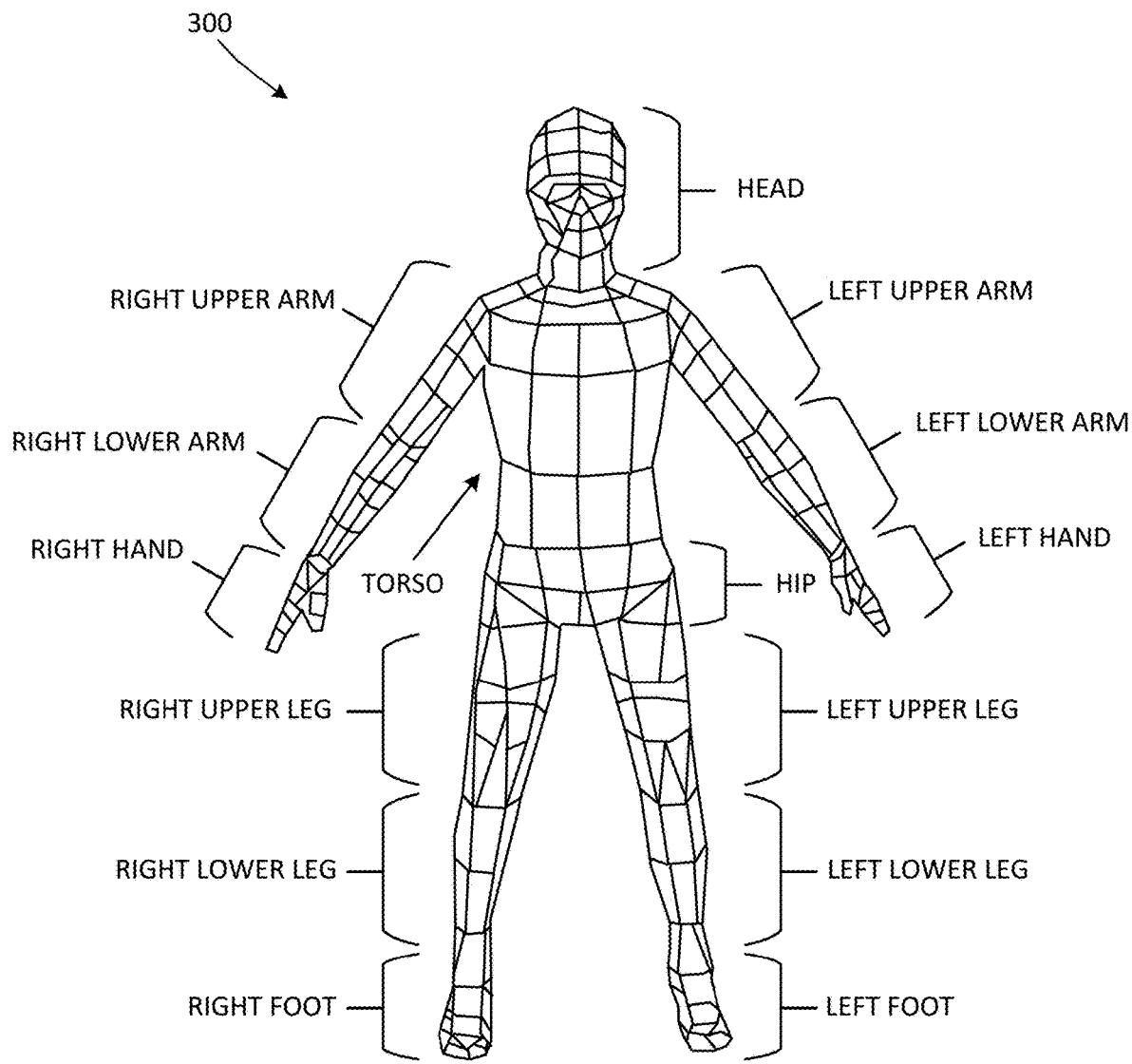
FIG. 3 shows an example of portions of a body cage that are grouped into corresponding body parts, in accordance with some embodiments.

In some embodiments, for bandwidth and performance/efficiency purposes or other reason(s), the number of feature points of a cage may be reduced to a smaller number than those provided above, such as 475 feature points (or some other number of feature points). Furthermore, in some embodiments, the feature points (vertices) in a body cage may be arranged into a plurality of groups (e.g., 15 groups) that each represent a portion of the body shape. FIG. 3 shows an example of portions of a body cage 300 that are grouped into corresponding body parts, in accordance with some embodiments.

More particularly, the 15 body parts shown in FIG. 3 are (for a humanoid mannequin): head, torso, hip, right foot, left foot, left lower leg, right lower leg, left upper leg, right upper leg, left hand, right hand, left lower arm, right lower arm, left upper arm, and right upper arm. The number of parts in any body shape may be greater or fewer than the 15 body parts shown. For example, a "one-armed" avatar character might have 12 (as opposed to 15) body parts, due to the omission of a hand, lower arm, and upper arm. Furthermore, other body shapes may involve a fewer or greater numbers of body parts, depending on factors such as body geometry, desired resolution, processing capability, type of avatar character (e.g., animal, alien, monster, and so forth), etc.

Each of the 15 groups/parts in FIG. 3 includes the feature points that define that part of the avatar body. Such group(s) of feature points can in turn be mapped to a corresponding piece of clothing. For example, the feature points in the body cage 300 that define the left/right lower arms, the left/right upper arms, and the torso may be used as an outer cage to be mapped with an inner cage of a jacket, in that a graphical representation of jacket is made up of graphical meshes that render left/right arms and a torso of the jacket that logically and correspondingly fit over left/right arms and a torso of an avatar body.

Moreover, this separation into multiple groups (such as shown in FIG. 3) enables customized fitting of a piece of clothing over non-typical body shapes. For instance, a 3D avatar may be in the form of a "one-armed" avatar character that is missing the left arm. Thus, the body cage for that 3D avatar would be missing the groups of feature points corresponding to the left hand, left lower arm, and left upper arm. When a jacket is subsequently selected for fitting over that 3D avatar, the right lower arm, right upper arm, and torso of the jacket can be deformed to fit over the corresponding right lower arm, right upper arm, and torso of the 3D avatar (body mannequin), and the left lower arm and the left upper arm of the jacket are not deformed (e.g., remains rigid in its original form from its parent space) since there is no left arm cage in the body mannequin to deform against.

Figure 4:
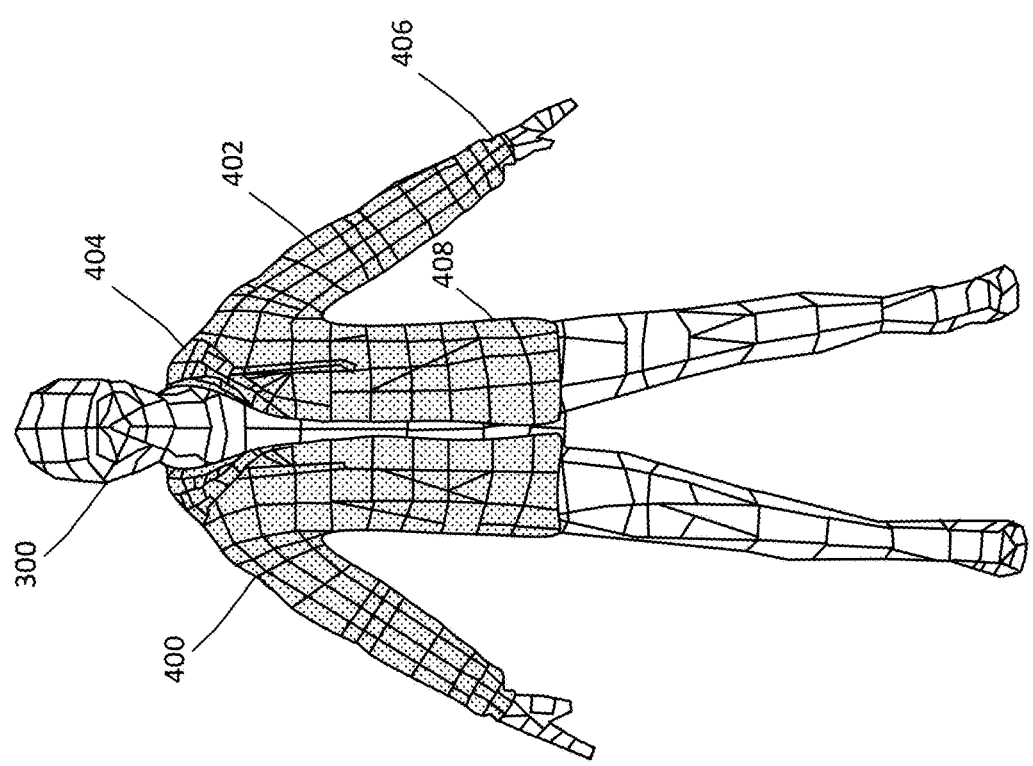
FIG. 4 shows an example of a clothing layer deformed over a body cage, in accordance with some embodiments.

FIG. 4 shows an example of a clothing layer 400 deformed over a body cage (such as the body cage 300 shown in FIG. 3), in accordance with some embodiments. The clothing layer 400 is a graphical representation of a jacket (shown in gray shading in FIG. 4) having parts that may be generated/rendered using a polygon mesh 402 (e.g., a clothing mesh) that is comprised of a collection of vertices, edges, and faces (which may be triangle faces or other polygon faces).

The clothing layer 400 includes an inner cage (not shown in FIG. 4) having feature points that correspond to the feature points of the body cage 300. Specifically, the feature points of the inner cage of the clothing layer 400 are mapped to the feature points of the body cage 300 that make up the left and right lower arms, the left and right upper arms, and the torso. In some embodiments, this mapping includes mapping the feature points of the inner cage of the clothing layer 400 directly onto the coordinate locations of the corresponding feature points of the arms and torso of the body cage 300. Such mapping may involve a 1:1 correspondence when both cages have same number of feature points, and the mapping may be n:1 or 1:n (wherein n is an integer greater than 1), in which case multiple feature points in one cage may be mapped to the same feature point of the other cage (or some feature points may be unmapped).

The clothing layer 400 further includes an outer cage having feature points that are spaced apart from and linked to the corresponding feature points of its inner cage of the clothing layer 400. The feature points of the outer cage of the clothing layer 400 define or are otherwise located along the external surface contours/geometry of the jacket, so as to define features such as a hood 404, cuffs 406, straight-cut torso 408, etc. of the jacket.

According to various embodiments, the spatial distances (e.g., a spatial distance between a feature point of the inner cage of the clothing layer 400 and a corresponding feature point of the outer cage of the clothing layer 400) are kept constant during the course of fitting the clothing layer 400 over an outer cage of an existing layer (or avatar body). In this manner, the feature points of the inner cage of the clothing layer 400 may be mapped to the feature points of the body cage 300, so as to "fit" the inside of the jacket over the avatar's torso and arms. Then, with the distances between the feature points of the inner cage of the clothing layer 400 and the corresponding feature points of the outer cage of the clothing layer 400 being kept constant, the outer contours of the jacket can also be deformed so as to match the shape of the avatar body, thereby resulting in at least partial preservation of the visual appearance (graphical representation) of the hood, cuffs, straight-cut torso and other surface features of the jacket while at the same time matching the shape of the avatar body as shown in FIG. 4. In this manner, the clothing layer 400 can be deformed in any appropriate manner so as to fit any arbitrary shape/size of an avatar body (body cage), such as tall, short, slim, muscular, humanoid, animal, alien, etc.

Figure 5:
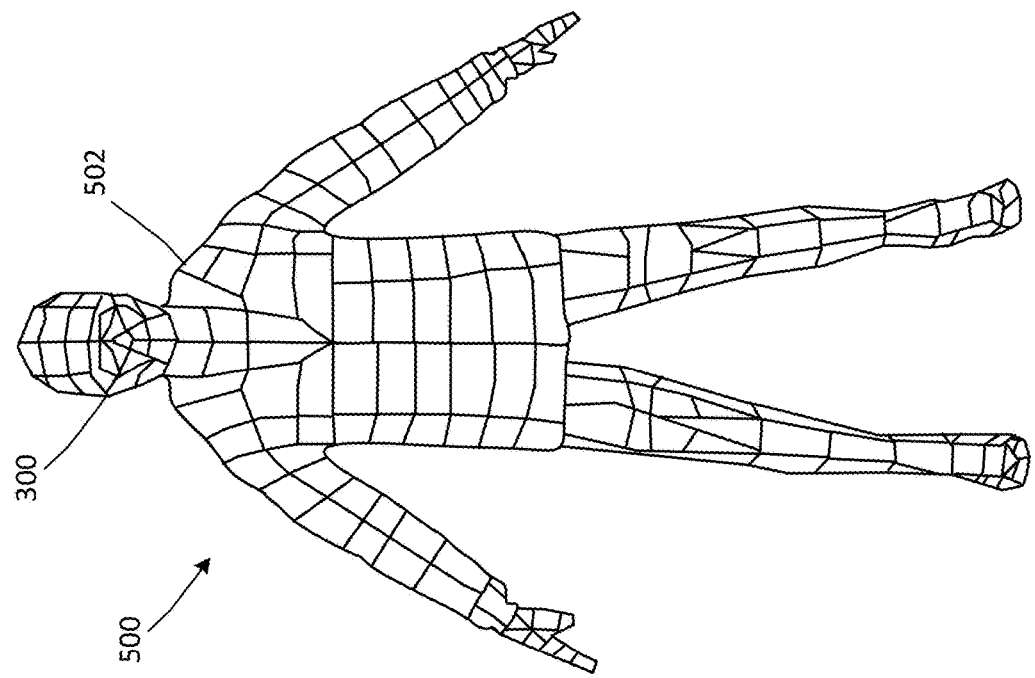
FIG. 5 shows an example of an outer cage formed based on the clothing layer and portions of the body cage of FIG. 4, in accordance with some embodiments.

In some embodiments, additional clothing layers over other clothing layer(s) can be placed (e.g., in response to user selection). FIG. 5 shows an example of the clothing layer and portions of the body cage 300 of FIG. 4 being used to form an outer cage 500, in accordance with some embodiments. More specifically, the feature points of the outer cage of the clothing layer 400 of FIG. 4 are now combined with the feature points of the body cage 300, so as to result in a composite outer cage 500 that is made up of feature points of exposed portions of the body cage 300 and feature points along the exterior surface of the jacket. For example, the exposed outer surfaces 502 of the jacket (formed by the body, hood, and sleeves of the jacket) provide a set of feature points and the exposed legs, hands, head, and part of the chest of the body that are not covered by the jacket provide another set of feature points, and these two sets of feature points (combined) provide the feature points of the outer cage 500.

The feature points of the outer cage 500 in FIG. 5, which correspond to and define the outer surface/shape of the jacket, may be the same feature points of the outer cage of the clothing layer 400 of FIG. 4. In some embodiments, different and/or additional and/or fewer feature points may be used for the region of the jacket in the outer cage 500 in FIG. 5, as compared to the feature points for the outer cage of the jacket (clothing layer 400) of FIG. 4. For instance, additional feature points may be computed for the outer cage 500 encompassed by the jacket area (as compared to the outer cage of the clothing layer 400 of FIG. 4), if higher resolution or more precise fitting is desired for the next layer of clothing above the outer cage 500. Analogously, feature points may be computed for the outer cage 500 encompassed by the jacket area (as compared to the outer cage of the clothing layer 400), if a lower resolution or less precise fitting is desired for the next layer of clothing above the outer cage 500 and/or due to other considerations such as processing/bandwidth efficiency improvements provided by using fewer feature points when possible.

In operation, if the user provides input to fit an additional clothing layer (such as an overcoat or other article of clothing) over the jacket (clothing layer 400) and/or over other parts of the avatar body, then the feature points of the inner cage of such additional clothing layer are mapped to the corresponding feature points of the outer cage 500. Deformation can thus be performed in a manner similar to that described with respect to FIG. 4.

Thus, in accordance with the examples of FIGS. 4 and 5 for layering clothing, a first layer of clothing (clothing layer 400) is wrapped around the body by matching the feature points of the "outer cage" (body cage 300) of the avatar body with the feature points of the "inner cage" of the first layer of clothing. This matching may be done in the UV space (where UV refers to a coordinate system) of the cages, so as not to have to rely on the number of feature points matching exactly between the inner and outer cages. For example, the feature points may be vertices with both position and texture space coordinates. Texture space coordinates is usually expressed in a range [0,1] each for U, V coordinates. The texture space may be thought of as an "unwrapped" normalized coordinate space for the vertices. By performing the correspondence of the two sets of vertices in the UV space and not using their positions, vertex-to-vertex correspondence can be done in the normalized space there by removing the hard requirement of exact vertex to vertex index mapping.

Per techniques described herein, each avatar body and clothing item is thus associated with an "inner cage" and an "outer cage." In the case of the avatar body, the inner cage represents a default "mannequin" (and different mannequins may be provided for different avatar body shapes) and the "outer cage" of the avatar body represents the envelope around the shape of the avatar body. For the clothing items, the "inner cage" represents the inner envelope that is used to define how the clothing item wraps around an underlying body (or around a body with prior clothing layers already fitted on it), and the "outer cage" represents the way that the next layer of clothing is wrapped around this particular clothing item when worn on the avatar body.

As previously explained above, a mesh is the actual visible geometry of an avatar and/or its clothing. For example, a body mesh includes the graphical representation of the arms, legs, torso, head parts, etc. of the avatar's body, and a clothing mesh includes the graphical representation of clothing. In comparison, a cage as shown and described above represents an envelope of features points around the avatar's body and/or clothing that may have some amount of correspondence to the corresponding vertices of the underlying mesh.

Figure 6:
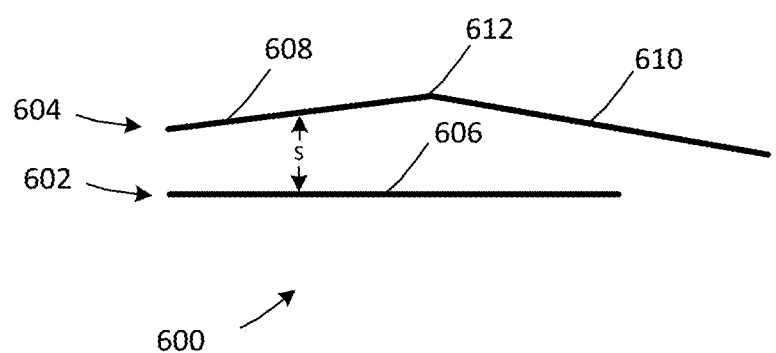
FIG. 6 is a diagram showing examples of a mesh and cage, in accordance with some embodiments.

FIG. 6 is a diagram 600 showing examples of a mesh 602 and cage 604, in accordance with some embodiments. More specifically, the diagram 600 represents a side view of the cage 604 that overlies/envelopes the mesh 602.

The mesh 602 may be a body mesh (e.g., graphically depicting a portion of the avatar's body, such as a hand, arm, etc.) or may be a clothing mesh (e.g., graphically depicting a portion of a piece of clothing, such as a sleeve, hood, etc.). The mesh 602 may include a mesh face 606 formed by the outwardly facing surface of a polygon (e.g., a triangle). The mesh 602 may include a plurality of polygons and their corresponding mesh faces, with the polygons connected to each other at their segment sides and vertices.

Analogously, the cage 604 may include a plurality of polygons (e.g., triangles) and their corresponding cage faces, such as previously shown and described above. The diagram 600 of FIG. 6 shows two cage faces 608 and 610 formed by outwardly facing surfaces of respective polygons of the cage 604. These polygons may be joined to each other at 612, which may be a segment or vertex.

The faces 606, 608, 610, and/or other faces or portions thereof of meshes or cages may be hidden or potentially hidden as additional clothing pieces are layered over the mesh 602 and cage 604. As will be further described below, the HSR techniques disclosed herein determine if such faces/surfaces or portions thereof should be hidden and then perform removal of the hidden surfaces so that the hidden surfaces are not rendered.

As shown in the diagram 600 of FIG. 6 and as previously explained above, the cage 604 overlies/envelopes the mesh 602. According to various embodiments, there may be a distance S (e.g., a distance in terms of pixels, in a normal/perpendicular direction relative to the surface of the mesh 602) between the mesh 602 and the cage 604, when the cage 604 is generated and placed over the mesh 602.

The distance S may vary over different regions of the mesh 602 and the cage 604. For example, the distance S may be substantially zero at some regions where the cage 604 touches the mesh 602, and the distance S may be greater than zero at other regions where there is a spatial separation between the mesh 602 and the cage 604.

Moreover, the diagram 600 shows that the single mesh face 606 is enveloped by two cage faces 608 and 610. This is merely an example. There may be a one-to-one overlap of cage faces to mesh faces at some regions, a one-to-many overlap of cage faces to mesh faces at some regions, a many-to-one overlap of cage faces to mesh faces at some regions, etc. Furthermore, the edges of the mesh faces and cage faces no not necessarily need to align with each other. For instance, in the diagram 600 of FIG. 6, the left edge of the cage face 608 is substantially aligned with the left edge of the mesh face 606. In comparison, the right edge of the cage face 610 extends past or is otherwise not aligned with the right edge of the mesh face 606.

According to various embodiments and as shown and described above with respect to FIGS. 1-5, a cage is enveloped over a body and/or over a clothing mesh (e.g., a piece or layer of clothing), and so such a cage becomes an outer cage that conforms to the shape and contours of the underlying surface. A next layer of clothing may be provided with inner and outer cages, such that deformation of this next layer of clothing is achieved by mapping, matching, or otherwise associating the points of the inner cage of this next layer of clothing to the corresponding points of the outer cage of the underlying body or layer of clothing. In some embodiments, the outer cage itself of the underlying body or layer of clothing is or becomes the inner cage of the next layer of clothing.

For the inner and outer cages of a particular piece/layer of clothing, the points of these inner and outer cages may be mapped to each other, such that when the points of the inner cage of this particular layer are associated/positioned with respect to the points of the outer cage of the underlying layer, deformation of the particular layer of clothing occurs when the points of its outer cage track/follow the displacement of the points of its inner cage.

According to some embodiments, deformation of clothing layers, so as to conform to an underlying body part or clothing layer, may involve the use of radial basis function (RBF) techniques. Some examples of RBF techniques that may be used for deformation and sequential layering are described in U.S. patent application Ser. No. 17/375,066, which is incorporated herein by references.

Figure 7:
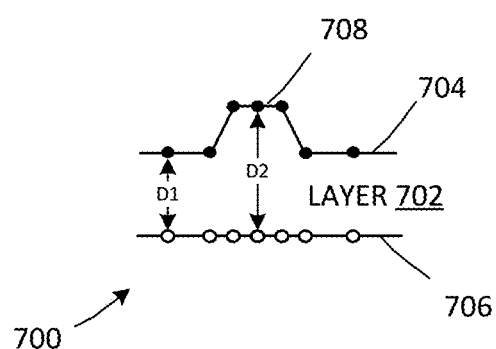
FIG. 7 shows a diagram showing a representation of a layer of clothing and its cages, in accordance with some embodiments.

Referring next to FIG. 7, a diagram 700 shows a representation of an individual clothing layer 702. The layer 702 is defined by, includes, or is enveloped by a pair of cages (e.g., an outer cage 704 and an inner cage 706). The layer 702 also includes a protrusion 708, along with the outer cage 704 having feature points (vertices) shown as solid dots and the inner cage 706 having feature points (vertices) shown as hollow dots. In some layer geometries wherein there may not be a 1-to-1 correspondence between a feature point in the inner cage 706 and a feature point in the outer cage 704 (e.g., one of the feature points is absent or misaligned), interpolation techniques may be used to define the missing feature point (e.g., reconstruct or fill in missing values).

A distance D1 between corresponding dots (outside of the protrusion 708) is the distance between a feature point in the outer cage 704 and a corresponding feature point in the inner cage 706. The distance D1 can have a value of equal or greater than 0 or more pixels, for instance. A distance D2 is the distance between a feature point in the outer cage 704 and a corresponding feature point in the inner cage 706, along the protrusion 708. The distance D2 can have a value of one pixel, two pixels or a greater number of pixels, for instance, such that the distance D2 is greater than the distance D1.

The distances D1 and D2 can be preserved as a new layer is conformingly fitted over an existing layer. In this manner, the visual appearance of surface features of a layer of clothing can be at least partially preserved as the layer is deformed. For example, a pair of "baggy" pants fitted over an avatar will still appear "baggy" even though the avatar body or underlying clothing layer may have a different shape/contour (slim or otherwise not baggy). As another example, a "spiked jacket" can be fitted over an avatar, and then a scarf can be conformingly fitted over the spiked jacket, so as to provide a visual appearance of a scarf being suspended by the "spikes" of the jacket, rather than following the peaks and valleys of each spike.

In some situations, layering one or more pieces of clothing over underlying layer(s) can result in the avatar having an inflated ("puffy") appearance, which appears unnatural or unrealistic. According to various embodiments, puffiness control techniques may be used to eliminate or otherwise reduce the puffy appearance.

For instance, the values of the distances D1 and/or D2 can be adjusted along certain portions of the layer 702, so as to not be uniform throughout the layer 702. This adjustment may be performed by adding interpolation or variance values to the RBF functions or otherwise manipulating/changing the values used by the RBF functions, for example.

In some embodiments, one or more threshold values for puffiness may be provided. For example, if adding the layer 702 over an existing layer causes the puffiness threshold value to be exceeded, the distances D1 and/or D2 of the layer can be reduced so that the resulting puffiness value is below the threshold value. Various techniques may be used to set or determine the puffiness threshold value, such as a maximum allowable distance between a bottommost surface (e.g., a body surface) and an uppermost surface (e.g., the outer surface of the last layer of clothing), a percentage thickness of one layer relative to another layer, a number of allowable layers, or other methods and combinations thereof.

Figure 9:
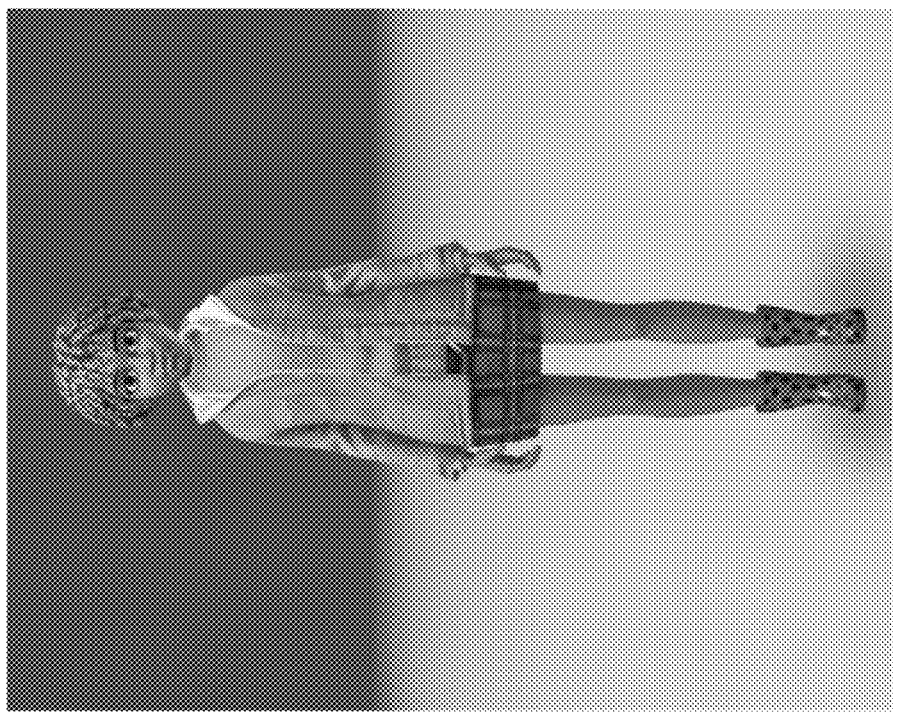
FIGS. 8 and 9 shows an avatar before and after hidden surface removal (HSR) is applied, in accordance with some embodiments.
Figure 8:
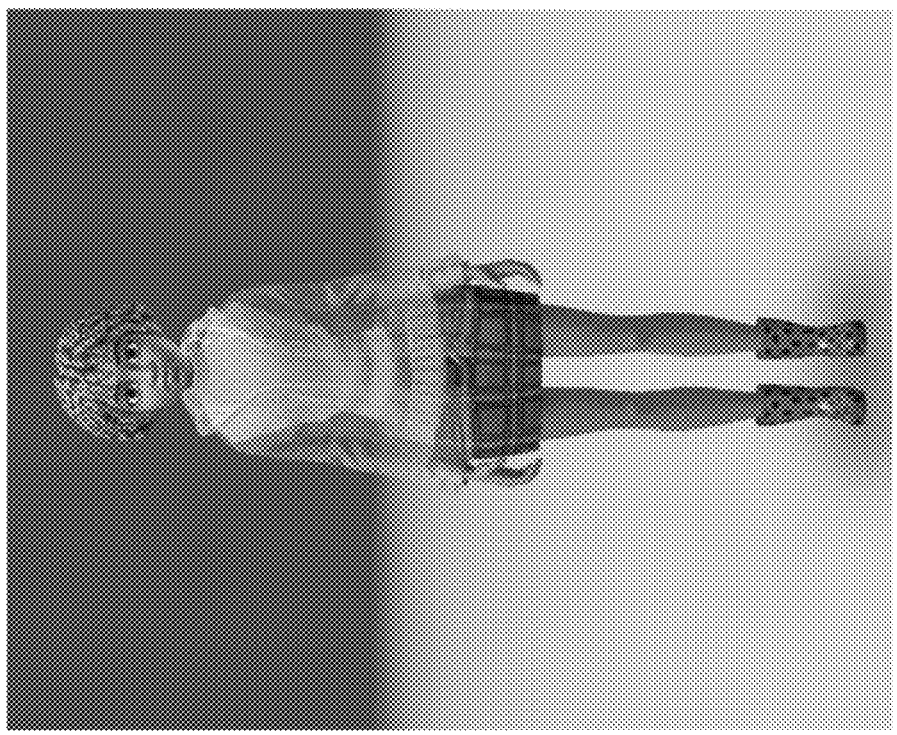

FIGS. 8 and 9 shows an avatar before and after HSR is applied, in accordance with some embodiments. In FIG. 8, several pieces of clothing (or other assets, such as hair) have been deformed so as to conform to the underlying body shape of the avatar and/or to an underlaying layer of clothing, and then fitted/placed (e.g., rendered) onto the avatar. The pieces of clothing shown in FIG. 8 include boots, a skirt, a sweater, and a jacket.

With regards to the layering of the pieces of clothing, the layering may include undergarments that overlay the avatar's body, the skirt that that overlays the undergarments, the sweater that overlays the undergarment and at least a portion of the skirt, and the jacket that overlays the sweater and at least a portion of the skirt. Without HSR being performed, FIG. 8 shows that at least some portions/surfaces of underlying clothing layers, which are not expected to be visible due to being covered by an overlaying layer of clothing, have been rendered and so are in fact visible. Transparency settings for the various pieces of clothing may also influence the degree of visibility of these underlying surfaces.

In addition to inefficient graphical processing (e.g., unnecessarily rendering various surfaces that should not be visible), the lack of HSR in the example of FIG. 8 also provides an undesirable appearance. For instance, the bleed-through (e.g., visibility) of surfaces of underlying pieces of clothing, which would have been expected to be hidden, results in an unnatural appearance.

In comparison to what is depicted in FIG. 8, FIG. 9 shows the avatar after HSR, as described herein, has been applied. The avatar and clothing layers in FIG. 9 have been rendered, such that surfaces of underlying body parts and clothing, which are obscured, are not rendered and so are not visible. Described next are techniques for performing HSR so as to achieve the visual appearance such as depicted in FIG. 9.

Figure 10:
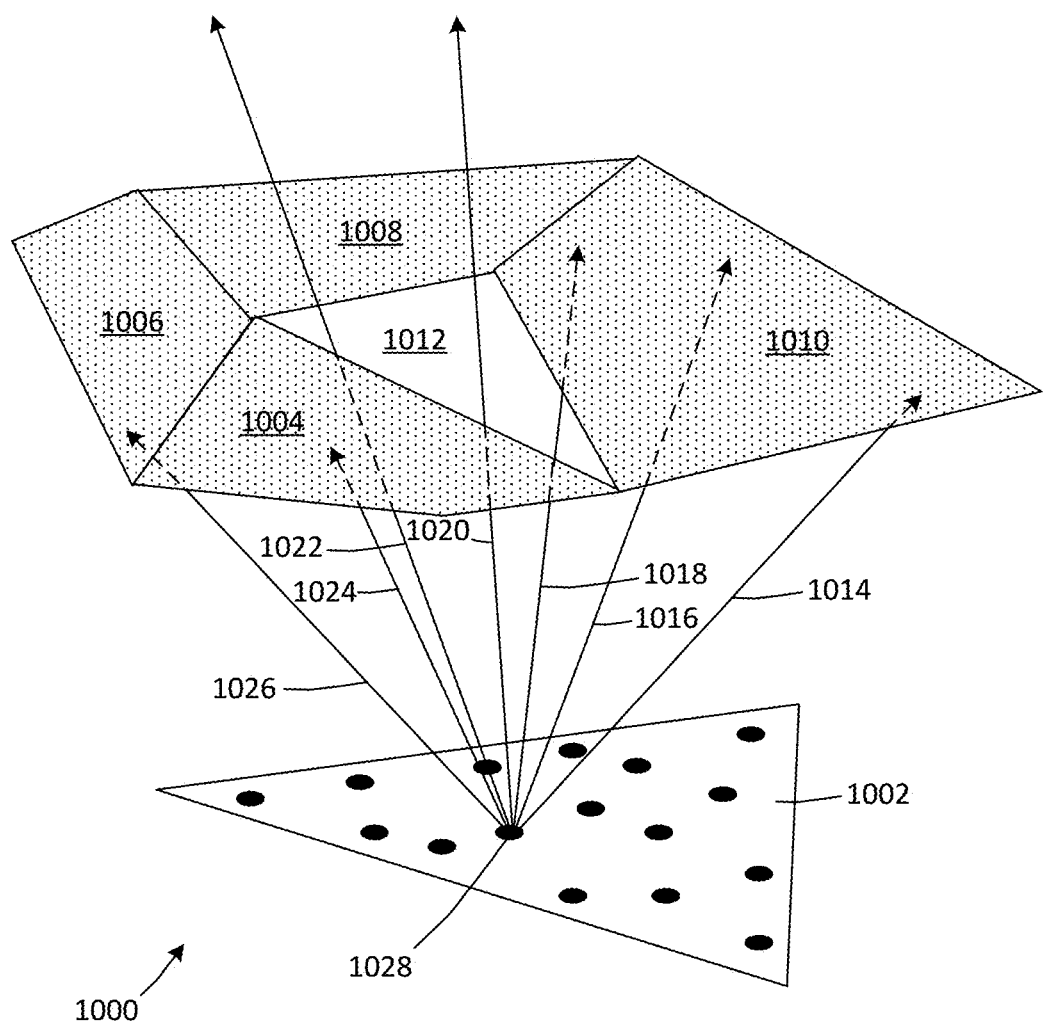
FIG. 10 is a diagram showing an example technique to determine whether a surface is potentially visible, in accordance with some embodiments.

FIG. 10 is a diagram 1000 showing an example technique to determine whether a surface is potentially visible, in accordance with some embodiments. More specifically, one or more faces 1002 of a cage form part of a potentially visible set (PVS) of faces, and the technique depicted in FIG. 10 determines whether the face 1002 of the cage is visible if overlaid by a layer/piece of clothing comprised of a clothing mesh having polygons 1004-1010.

According to various embodiments, the layer/piece of clothing of FIG. 10 has already been deformed so as to fit over an underlying layer, in a manner such as described previously described above, as opposed to being in its original (pre-deformation) state. By being in the deformed state when visibility determination/calculation is being performed, the deformed layer/piece of clothing more closely matches the arrangement and/or position of the polygons of the underlying cage faces, thereby enabling an accurate assessment of the visibility of these cage faces.

As previously explained above, the cage (having a plurality of faces including the face 1002) envelopes an underlying body mesh and/or clothing mesh, and therefore can be considered to be a proxy of the underlying body/clothing mesh(es). The polygons 1004-1010 of the example clothing mesh (layer of clothing) of FIG. 10 are arranged and shaped so as to define an opening 1012 in the layer of clothing. For example, the opening 1012 may be a gap at the edges of the clothing where no fabric is present, a hole in the fabric, etc. The opening 1012 may also be a transparent element, such as lenses of goggles, a face shield, a plastic/glass portion, etc.

To determine whether the face 1002 is visible if overlaid by the polygons 1004-1010 of the clothing mesh, a plurality of rays 1014-1026 are projected in a generally conical direction from a point 1028 (or multiple points) of the face 1002. The point 1028 may be one of a plurality of points on the face 1002. Such points may be randomly located on the face 1002 and/or may be at predefined locations.

As shown in FIG. 8, the rays 1020 and 1022 miss the polygons and so penetrate through the opening 1012, while the other rays 1014, 1016, 1018, 1024, and 1026 hit one or more of the polygons 1004, 1006, and 1010 of the clothing mesh. According to various embodiments, if at least one ray misses the polygons (faces) of the clothing mesh, then the face 1002 is deemed to be visible. In other embodiments, a minimum number of rays (e.g., a number greater than 1) may be used in order to deem a face as being visible.

According to various embodiments, the above visibility determination is performed by projecting rays from one point, and then repeating the projecting of the rays from another point, etc. in sequence. If no rays from a particular point penetrate the clothing mesh, then rays are projected from a next point. The face 1002 is determined to be visible, after one or more rays from a particular point are determined to miss the clothing mesh, and no additional rays need be projected from other points on the face 1002.

Figure 11:
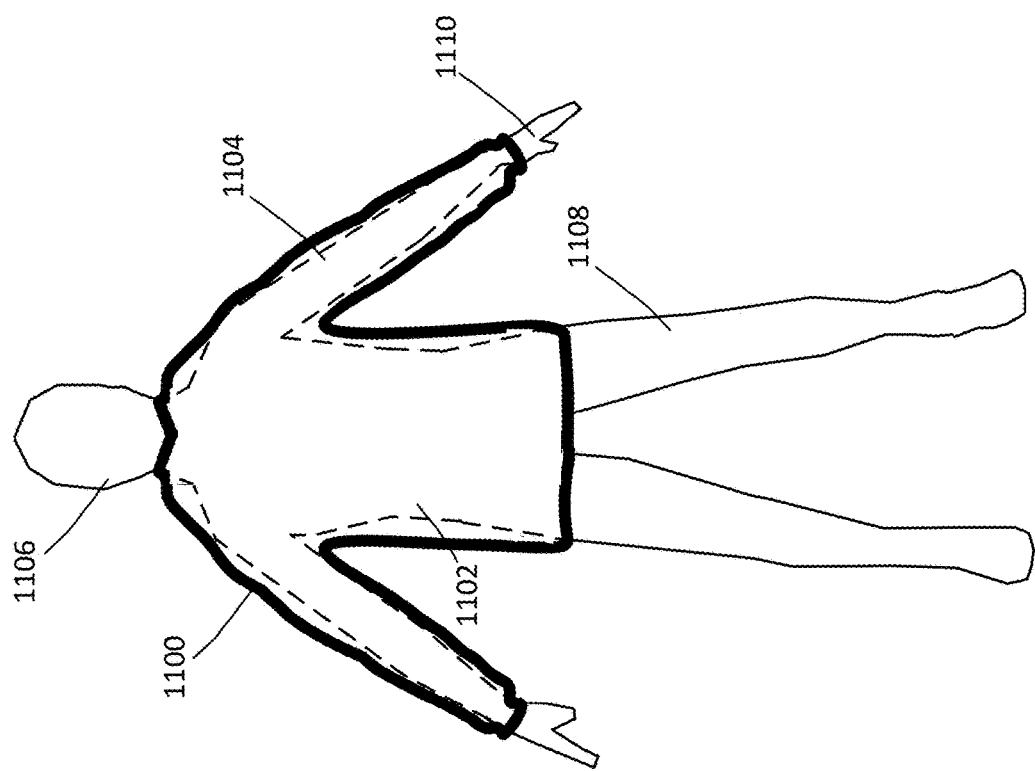

FIGS. 11-14 are diagrams illustrating a method to perform HSR, in accordance with some embodiments, and which may be based at least in part on the mesh and cage arrangements, deformation and layering technique, visibility determination technique, etc. previously described above. With reference first to FIG. 11, a piece of clothing (e.g., a clothing mesh 1100 depicted as a long sleeve shirt in heavy solid lines) has been deformed so as to fit over the torso 1102 and each arm 1104 of an avatar body.

Using the visibility determination technique of FIG. 10, the cage faces of the body cage of the avatar body, which correspond to the torso 1102 and arms 1104 and which underlie the clothing mesh 1100, are determined to be not visible (hidden). The portions of the body cage corresponding to the torso 1102 and arms 1104 are thus set as invisible (depicted by broken lines in FIG. 11), while the portions of the body cage (which are located outside of the clothing mesh 1100) are set as visible. Thus, the faces of the body cage corresponding to the head 1106, each leg 1108, and each hand 1110 are set as visible (depicted by solid lines in FIG. 11), as well as the faces of the clothing mesh 1100.

Figure 12:
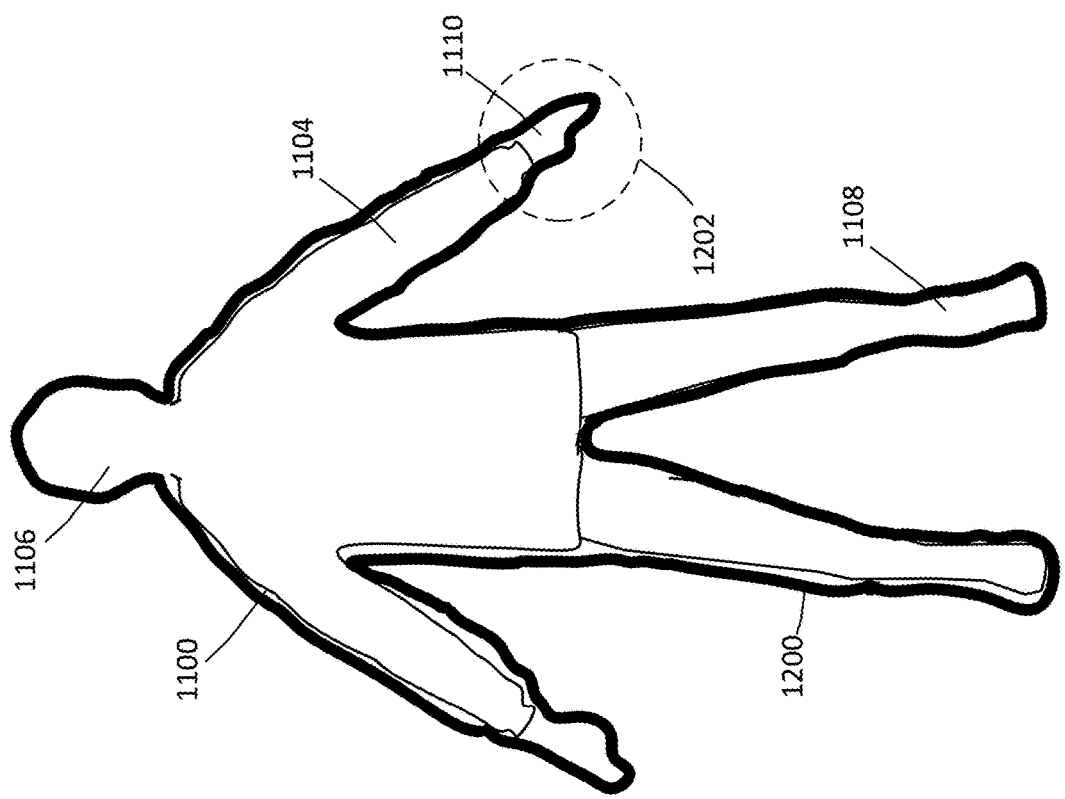
FIGS. 11-14 are diagrams representing a method to perform HSR, in accordance with some embodiments.

Next in FIG. 12, an outer cage 1200 (depicted by heavy solid lines) is formed, overlaid, or otherwise provided for the clothing mesh 1100, for visible parts of the body mesh (e.g., the head 1106, each leg 1108, and each hand 1110), and/or for any other visible surface of the avatar body, all of which are collectively depicted by non-heavy solid lines in FIG. 12. The sleeve and hand portions (shown at a circle 1202) are described next as an example with respect to FIG. 13, with regards to operations performed as part of HSR to map faces of a mesh to corresponding faces of an overlying cage.

Figure 13:
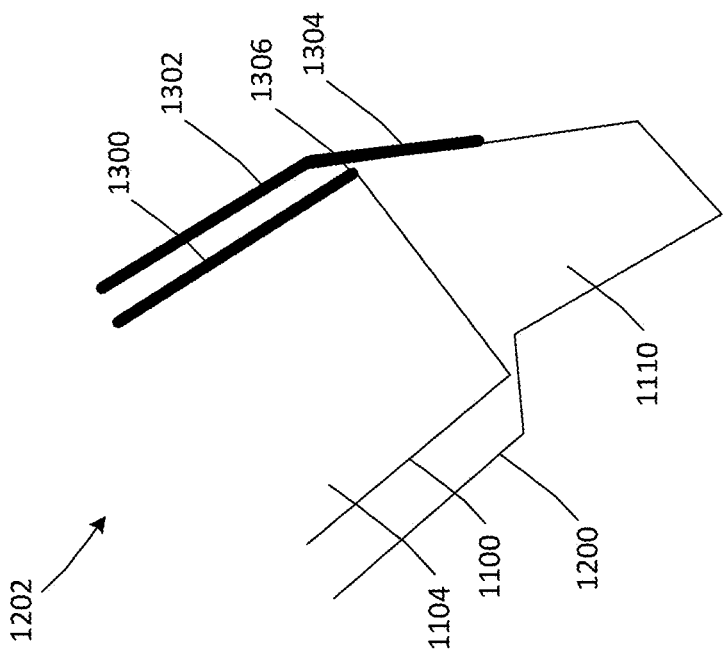

Specifically in FIG. 13, a sleeve of the clothing mesh 1100 is provided for the arm 1104. As previously described above in FIG. 12 and as also shown in FIG. 13, the outer cage 1200 envelopes the clothing mesh 1100 and the hand 1110.

The clothing mesh 1100 includes a plurality of mesh faces, including a particular face 1300 (shown in a heavy solid line) at the hand end of the sleeve. Similarly, the outer cage 1200 includes a plurality of cage faces, including faces 1302 and 1304 also shown in heavy solid lines. The face 1302 envelopes the face 1300 at the sleeve, and the face 1304 envelopes a portion of the face 1300 at the sleeve and also a portion of the hand 1110 near/at the wrist.

For each face of the clothing mesh 1100, the HSR method determines which face(s) of the outer cage 1200 are related to (or are otherwise associated with or mapped to) that face of the clothing mesh 1100. Thus, for the example of FIG. 13, the HSR method determines that the faces 1302 and 1304 of the outer cage 1200 are related to the face 1300 of the clothing mesh 1100.

This determination of relationship between faces corresponds to a determination that the faces 1302 and 1304 of the outer cage 1200 affect the face 1300 of the clothing mesh 1100. According to some embodiments, the related faces 1302 and 1304 may be identified by identifying each vertex of the face 1300, and then identifying the faces on the outer cage 1200 that are closest to the vertex. For instance, the faces 1302 and 1304 are closest to a vertex 1306 of the face 1300. The distances from the vertices of each face of the clothing mesh 1300 can be based on the distance S (such as shown in FIG. 6) and/or based on some other non-normal or normal distance from the face of the clothing mesh 1300.

Having made the determination of the related faces in FIG. 13, the corresponding data may be saved as one or more vectors, configuration data, metadata, or other data structure(s) for the clothing mesh 1100. For example, a vector may have two values: an identifier of the particular face 1300 of the clothing mesh 1100, and identifiers of the faces 1302 and 1304 of the outer cage 1200 that have been related to the face 1300. Also, data pertaining to the hidden portions of the body cage (such as depicted in broken lines in FIG. 11) and/or any other underlying surface that is hidden by the clothing mesh 1100 may also be stored as a vector or other type of data structure(s) for the clothing mesh 1100. All of this data for the clothing mesh 1100 and other meshes, cages, faces, etc. may be stored in a server and/or other location for future use, so to reduce the number of recalculations (repeats) of the visibility determination, related surfaces determination, etc. whenever the clothing mesh 1100 is loaded/reloaded.

With the data (e.g., visibility and related faces) as determined above with respect to FIGS. 11-13, the HSR method may then utilize this data when layering subsequent pieces of clothing. According to various embodiments, when applying an outer layer of clothing over an underlying (inner) layer of clothing (or avatar body), three components are considered by the HSR method: the inner layer's mesh, the inner layer's outer cage, and the outer layer's inner cage.

Figure 14:
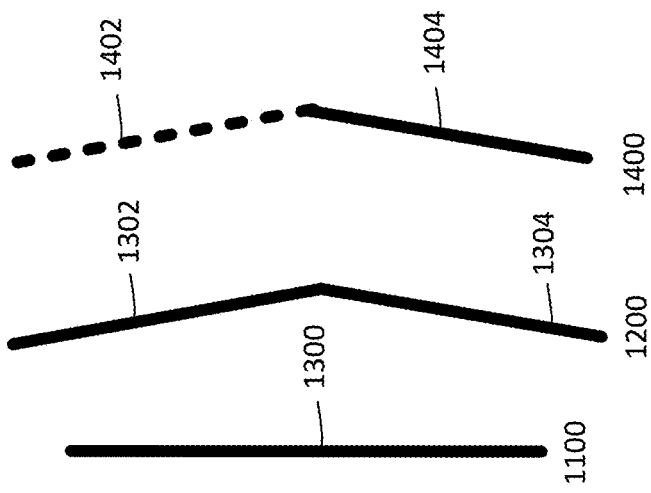

For example, FIG. 14 shows of the previously described clothing mesh 1100 and the outer cage 1200 of the clothing mesh 1100. The clothing mesh 1100 includes the visible face 1300, which overlies the hidden portion of the body cage (not shown in FIG. 14, and shown as broken lines in FIG. 11). The outer cage 1200 includes the related faces 1302 and 1304.

FIG. 14 then depicts an inner cage 1400 of the next (outer) layer of clothing (e.g., a next clothing mesh, not shown). When this outer layer of clothing is deformed so as to fit over the clothing mesh 1100 (e.g., over the long sleeve shirt), faces 1402 and 1404 of the inner cage 1400 of the outer layer of clothing are mapped to the respective faces 1302 and 1304 of the outer cage 1200. In some embodiments, the outer cage 1200 itself is or becomes the inner cage 1400. The cage faces 1402 and 1404 of the inner cage 1400 may correspond to one or more mesh faces or mesh face portions of the outer layer of clothing.

A visibility determination (such as described above with respect to FIG. 10) can then be performed to determine whether the faces 1302 and 1304 are visible or are hidden by the outer clothing mesh corresponding to the inner cage 1400. In the example of FIG. 14, the face 1302 of the outer cage 1200 is determined to be hidden by one or more mesh faces (of the outer clothing mesh) corresponding to the inner cage face 1402, such as represented by a broken line in FIG. 14). The face 1304 of the outer cage 1200 (and which corresponds to the inner cage face 1404) is determined to be visible through the outer clothing mesh, such as represented by solid line in FIG. 14.

Because the faces 1302 and 1304 are the related faces of the visible face 1300 of the clothing mesh 1100, and because at least one of these related faces (e.g., the face 1304) is determined to be visible when the outer layer of clothing (having the inner cage 1400) is fitted, the entire face 1300 of the inner/underlying clothing mesh is deemed to be visible and is rendered when the outer layer of clothing is fitted on the avatar body. In a different situation in which both the face 1302 and the face 1304 of the outer cage 1200 are determined to be hidden by the mesh face(s) of the outer layer of clothing, the entire face 1300 of the clothing mesh 1100 is marked as invisible/hidden and is not rendered when the outer layer of clothing is fitted on the avatar body.

The operations described above for the HSR method can then be repeated/iterated for additional mesh faces and for additional layer(s) of clothing are deformed and fitted over the avatar body and/or its existing clothing layer(s).

Figure 15:
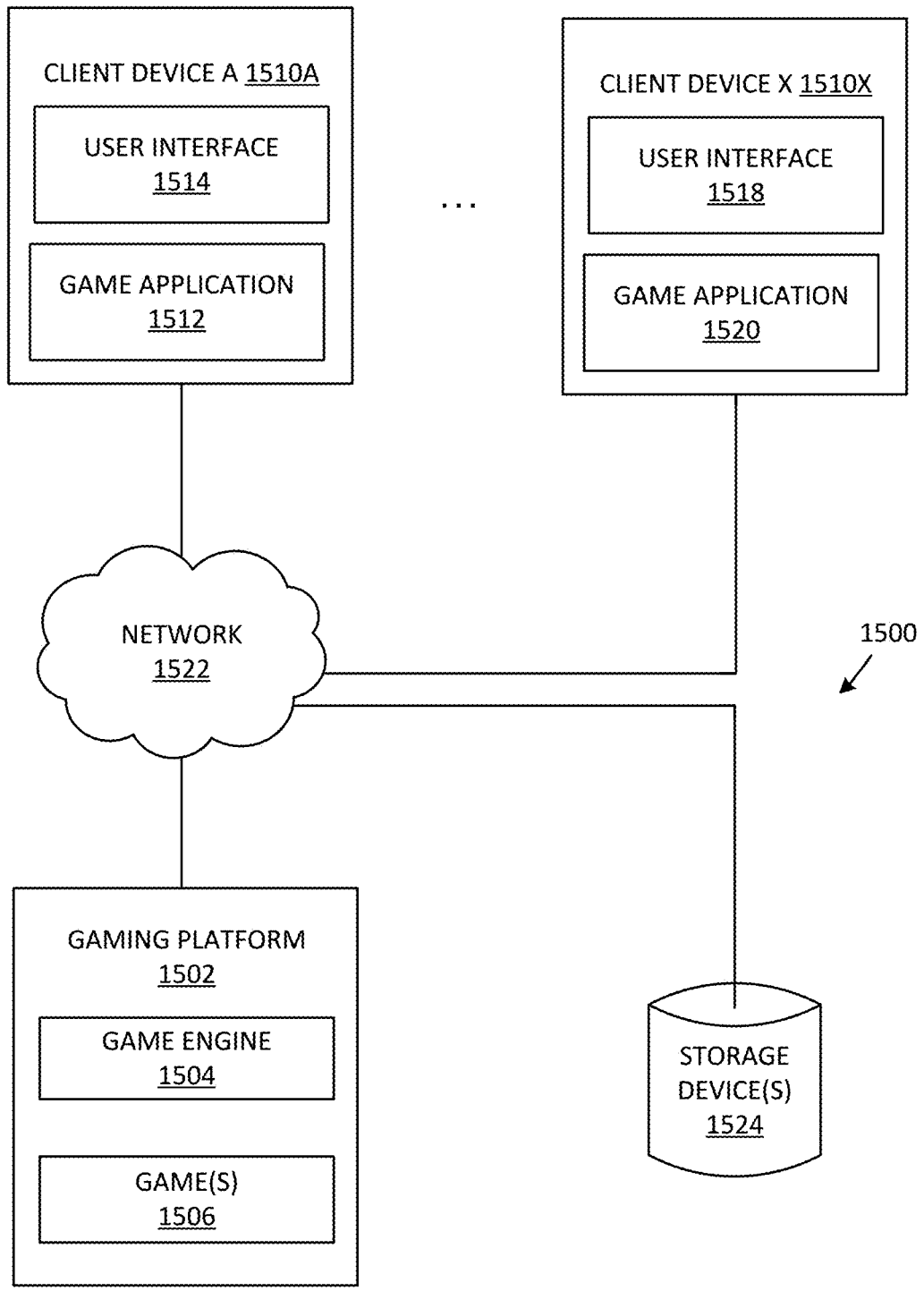
FIG. 15 diagram of an example system architecture that includes a 3D environment platform that can support 3D avatars with layered clothing, in accordance with some embodiments.

FIG. 15 is a diagram of an example system architecture 1500 that includes a 3D environment platform that can support 3D avatars with layered clothing, in accordance with some embodiments. In the example of FIG. 15, the 3D environment platform will be described in the context of a gaming platform 1502 purely for purposes of explanation, and various other embodiments can provide other types of 3D environment platforms, such as online meeting platforms, virtual reality (VR) or augmented reality (AR) platforms, or other types of platforms that can provide 3D content. The description provided herein for the gaming platform 1502 and other elements of the system architecture 1500 can be adapted to be operable with such other types of 3D environment platforms.

Online gaming platforms (also referred to as "user-generated content platforms" or "user-generated content systems") offer a variety of ways for users to interact with one another, such as while the users are playing an electronic game. For example, users of an online gaming platform may work together towards a common goal, share various virtual gaming items, send electronic messages to one another, and so forth. Users of an online gaming platform may play games using characters, such as the 3D avatars having layered clothing with HSR features as described above, which the users can navigate through a 3D world rendered in the electronic game.

An online gaming platform may also allow users of the platform to create and animate avatars, as well as allowing the users to create other graphical objects to place in the 3D world. For example, users of the online gaming platform may be allowed to create, design, and customize the avatar, and to create, design, and fit various clothing items onto the avatar.

In FIG. 15, the example system architecture 1500 (also referred to as "system" herein) includes the online gaming platform 1502, a first client device 1510A and at least one second client device X 1510X (generally referred to as "client device(s) 1510" herein). The online gaming platform 1502 can include, among other things, a game engine 1504 and one or more electronic games 1506. The system architecture 1500 is provided for illustration of one possible embodiment. In other embodiments, the system architecture 1500 may include the same, fewer, more, or different elements configured in the same or different manner as that shown in FIG. 15.

A communication network 1522 may be used for communication between the online gaming platform 1502 and the client devices 1510, and/or between other elements in the system architecture 1500. The network 1522 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long-term evolution (LTE) network), routers, hubs, switches, server computers, or a combination thereof.

The client device 1510A can include a game application 1512 and one or more user interfaces 1514 (e.g., audio/video input/output devices). Similarly, the client device X 1500X can include a game application 1520 and user interfaces 1518 (e.g., audio/video input/output devices). The audio/video input/output devices can include one or more of a microphone, speakers, headphones, display device, camera, etc.

The system architecture 1500 may further include one or more storage devices 1524. The storage device 1524 may be, for example, a storage device located within the online gaming platform 1502 or communicatively coupled to the online gaming platform 1502 via the network 1522 (such as depicted in FIG. 15). The storage devices 1524 may store, for example, graphical objects that are rendered in the game 1506 by the game engine 1504 or by the game applications 1512/1520, as well as the configuration/properties information of the graphical objects (such as coordinate information of feature points, size dimensions, etc. that are usable for generating cages and for deformation such as described above). In some embodiments, the storage device 1524 may further store HSR-related information, such as vectors or other data structure(s) that identify surfaces that are visible or invisible, faces that are related to each other, etc. for clothing and body meshes and for clothing and body cages.

In some embodiments, the storage devices 1524 can be part of one or more separate content delivery networks that provide the graphical objects rendered in the game 1506. For instance, an avatar creator can publish avatar templates in a library accessible at a first storage device, and a clothing creator can (separately and independently from the avatar creator) publish clothing templates in a library accessible at a second storage device. Then, the game application 1512 may pull (or have pushed to it) graphical objects (avatars and clothing items) stored in the first/second storage devices, for computation/compilation/deformation at runtime for presentation during the course of playing the game.

In one embodiment, the storage device 1524 may be a non-transitory computer readable memory (e.g., random access memory), a cache, a drive (e.g., a hard drive), a flash drive, a database system, or another type of component or device capable of storing data and other content. The storage device 1524 may also include multiple storage components (e.g., multiple drives or multiple databases) that may also span multiple computing devices (e.g., multiple server computers).

In some embodiments, the online gaming platform 1502 can include a server having one or more computing devices (e.g., a cloud computing system, a rackmount server, a server computer, cluster of physical servers, etc.). In some embodiments, a server may be included in the online gaming platform 1502, be an independent system, or be part of another system or platform.

In some embodiments, the online gaming platform 1502 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 1502 and to provide a user with access to online gaming platform 1502. The online gaming platform 1502 may also include a website (e.g., a webpage) or application back-end software that may be used to provide a user with access to content provided by online gaming platform 1502. For example, a user may access online gaming platform 1502 using the game application 1512 on the client device 1510.

In some embodiments, online gaming platform 1502 may be a type of social network providing connections between users or a type of user-generated content system that allows users (e.g., end-users or consumers) to communicate with other users on the online gaming platform 1502, where the communication may include voice chat (e.g., synchronous and/or asynchronous voice communication), video chat (e.g., synchronous and/or asynchronous video communication), or text chat (e.g., synchronous and/or asynchronous text-based communication). In some embodiments of the disclosure, a "user" may be represented as a single individual. However, other embodiments in this disclosure encompass a "user" (e.g., creating user) being an entity controlled by a set of users or an automated source. For example, a set of individual users federated as a community or group in a user-generated content system may be considered a "user."

In some embodiments, online gaming platform 1502 may be a virtual gaming platform. For example, the gaming platform may provide single-player or multiplayer games to a community of users that may access or interact with games using client devices 1510 via the network 1522. In some embodiments, games (also referred to as "video game," "online game," or "virtual game" etc. herein) may be two-dimensional (2D) games, three-dimensional (3D) games (e.g., 3D user-generated games), virtual reality (VR) games, or augmented reality (AR) games, for example. In some embodiments, users may participate in gameplay with other users. In some embodiments, a game may be played in real-time with other users of the game.

In some embodiments, gameplay may refer to interaction of one or more players using client devices (e.g., the client device 1510) within a game (e.g., the game 1506) or the presentation of the interaction on a display or other user interfaces (e.g., the user interface 1514/1518) of a client device 1510.

In some embodiments, the game 1506 can include an electronic file that can be executed or loaded using software, firmware or hardware configured to present the game content (e.g., digital media item) to an entity. In some embodiments, the game application 1512 may be executed and the game 1506 rendered in connection with the game engine 1504. In some embodiments, the game 1506 may have a common set of rules or common goal, and the environments of a game 1506 share the common set of rules or common goal. In some embodiments, different games may have different rules or goals from one another.

In some embodiments, games may have one or more environments (also referred to as "gaming environments" or "virtual environments" herein) where multiple environments may be linked. An example of an environment may be a 3D environment. The one or more environments of the game 1506 may be collectively referred to a "world" or "gaming world" or "virtual world" or "universe" herein. For example, a user may build a virtual environment that is linked to another virtual environment created by another user. A character of the virtual game (such as a 3D avatar having layered clothing such that hidden surfaces are removed as described herein) may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some embodiments, the online gaming platform 1502 can host one or more games 1506 and can permit users to interact with the games 1506 using the game application 1512 of the client device 1510. Users of the online gaming platform 1502 may play, create, interact with, or build games 1506, communicate with other users, and/or create and build objects (e.g., also referred to as "item(s)" or "game objects" or "virtual game item(s)" or "graphical objects" herein) of games 1506. For example, in generating user-generated virtual items, users may create characters, animation for the characters, decoration (e.g., clothing, skins, accessories, etc.) for the characters, one or more virtual environments for an interactive game, or build structures used in the game 1506, among others. In some embodiments, users may buy, sell, or trade game virtual game objects, such as in-platform currency (e.g., virtual currency), with other users of the online gaming platform 1502.

In some embodiments, online gaming platform 1502 may transmit game content to game applications (e.g., the game application 1512). In some embodiments, game content (also referred to as "content" herein) may refer to any data or software instructions (e.g., game objects, game, user information, video, images, commands, media item, etc.) associated with online gaming platform 1502 or game applications. In some embodiments, game objects (e.g., also referred to as "item(s)" or "objects" or "virtual game item(s)" herein) may refer to objects that are used, created, shared, or otherwise depicted in the game 1506 of the online gaming platform 1502 or game applications 1512 or 1520 of the client devices 1510. For example, game objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the online gaming platform 1502 hosting games 1506, is provided for purposes of illustration. In some embodiments, online gaming platform 1502 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some embodiments, a media item may be an electronic file that can be executed or loaded using software, firmware or hardware configured to present the digital media item to an entity.

In some embodiments, the game 1506 may be associated with a particular user or a particular group of users (e.g., a private game), or made widely available to users of the online gaming platform 1502 (e.g., a public game). In some embodiments, where online gaming platform 1502 associates one or more games 1506 with a specific user or group of users, online gaming platform 1502 may associate the specific user(s) with a game 1502 using user account information (e.g., a user account identifier such as username and password).

In some embodiments, online gaming platform 1502 or client devices 1510 may include the game engine 1504 or game application 1512/1520. In some embodiments, game engine 1504 may be used for the development or execution of games 1506. For example, game engine 1506 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 1504 may generate commands that help compute and render the game (e.g., rendering commands, collision commands, animation commands, physics commands, etc.), including commands to select an avatar, customize the avatar, select clothing items, deform the clothing items as layers on the avatar, perform HSR, and various other operations described herein. In some embodiments, game applications 1512/1518 of client devices 1510 may work independently, in collaboration with game engine 1504 of online gaming platform 1502, or a combination of both, in order to perform the operations described herein related to deforming and rendering layered clothing with hidden surfaces removed, at runtime.

In some embodiments, both the online gaming platform 1502 and client devices 1510 execute a game engine or a game application (1504, 1512, 1520, respectively). The online gaming platform 1502 using game engine 1504 may perform some or all the game engine functions (e.g., generate physics commands, animation commands, rendering commands, etc., including deformation of clothing layers and removal of hidden surfaces as described above), or offload some or all the game engine functions to the game application 1512 of client device 1510. In some embodiments, each game 1506 may have a different ratio between the game engine functions that are performed on the online gaming platform 1502 and the game engine functions that are performed on the client devices 1510.

For example, the game engine 1504 of the online gaming platform 1502 may be used to generate physics commands in cases where there is a collision between at least two game objects, while the additional game engine functionality (e.g., generate rendering commands, including deforming and displaying layered clothing with hidden surfaces removed) may be offloaded to the client device 1510. In some embodiments, the ratio of game engine functions performed on the online gaming platform 1502 and client device 1510 may be changed (e.g., dynamically) based on gameplay conditions. For example, if the number of users participating in gameplay of a particular game 1506 exceeds a threshold number, the online gaming platform 1502 may perform one or more game engine functions that were previously performed by the client devices 1510.

For example, users may be playing a game 1506 on client devices 1510, and may send control instructions (e.g., user inputs, such as right, left, up, down, user election, or character position and velocity information, etc.) to the online gaming platform 1502. Subsequent to receiving control instructions from the client devices 1510, the online gaming platform 1502 may send gameplay instructions (e.g., position and velocity information of the characters participating in the group gameplay or commands, such as rendering commands, collision commands, etc.) to the client devices 1510 based on control instructions. For instance, the online gaming platform 1502 may perform one or more logical operations (e.g., using game engine 1504) on the control instructions to generate gameplay instruction for the client devices 1510. In other instances, online gaming platform 1502 may pass one or more or the control instructions from one client device 1510 to other client devices participating in the game 1506. The client devices 1510 may use the gameplay instructions and render the gameplay for presentation on the displays of client devices 1510, including the avatars with layered clothing with HSR as described above.

In some embodiments, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some embodiments, the control instructions are sent directly to the online gaming platform 1502. In other embodiments, the control instructions may be sent from the client device 1510 to another client device, where the other client device generates gameplay instructions using the local game engine application 1520. The control instructions may include instructions to play a voice communication message or other sounds from another user on an audio device (e.g., speakers, headphones, etc.), for example voice communications or other sounds generated using the audio spatialization techniques as described herein.

In some embodiments, gameplay instructions may refer to instructions that allow the client device 1510 to render gameplay of a game, such as a multiplayer game. The gameplay instructions may include one or more of user input (e.g., control instructions), character position and velocity information, or commands (e.g., physics commands, animation commands, rendering commands, collision commands, etc.).

In some embodiments, the client device(s) 1510 may each include computing devices such as personal computers (PCs), mobile devices (e.g., laptops, mobile phones, smart phones, tablet computers, or netbook computers), network-connected televisions, gaming consoles, etc. In some embodiments, a client device 1510 may also be referred to as a "user device." In some embodiments, one or more client devices 1510 may connect to the online gaming platform 1502 at any given moment. It may be noted that the number of client devices 1510 is provided as illustration, rather than limitation. In some embodiments, any number of client devices 1510 may be used.

In some embodiments, each client device 1510 may include an instance of the game application 1512 or 1520. In one embodiment, the game application 1512 or 1520 may permit users to use and interact with online gaming platform 1502, such as control a virtual character in a virtual game hosted by online gaming platform 1502, or view or upload content, such as games 1506, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 1510 and allows users to interact with online gaming platform 1502. The game application may render, display, or present the content (e.g., a web page, a media viewer) to a user. In an embodiment, the game application may also include an embedded media player (e.g., a Flash® player) that is embedded in a web page.

According to aspects of the disclosure, the game application 1512/1520 may be an online gaming platform application for users to build, create, edit, upload content to the online gaming platform 1502 as well as interact with online gaming platform 1502 (e.g., play games 1506 hosted by online gaming platform 1502). As such, the game application 1512/1520 may be provided to the client device 1510 by the online gaming platform 1502. In another example, the game application may be an application that is downloaded from a server.

In some embodiments, a user may login to online gaming platform 1502 via the game application. The user may access a user account by providing user account information (e.g., username and password) where the user account is associated with one or more characters available to participate in one or more games 1506 of online gaming platform 1502.

In general, functions described in one embodiment as being performed by the online gaming platform 1502 can also be performed by the client device(s) 1510, or a server, in other embodiments if appropriate. In addition, the functionality attributed to a particular component can be performed by different or multiple components operating together. The online gaming platform 1502 can also be accessed as a service provided to other systems or devices through appropriate application programming interfaces (APIs), and thus is not limited to use in websites.

Figure 16:
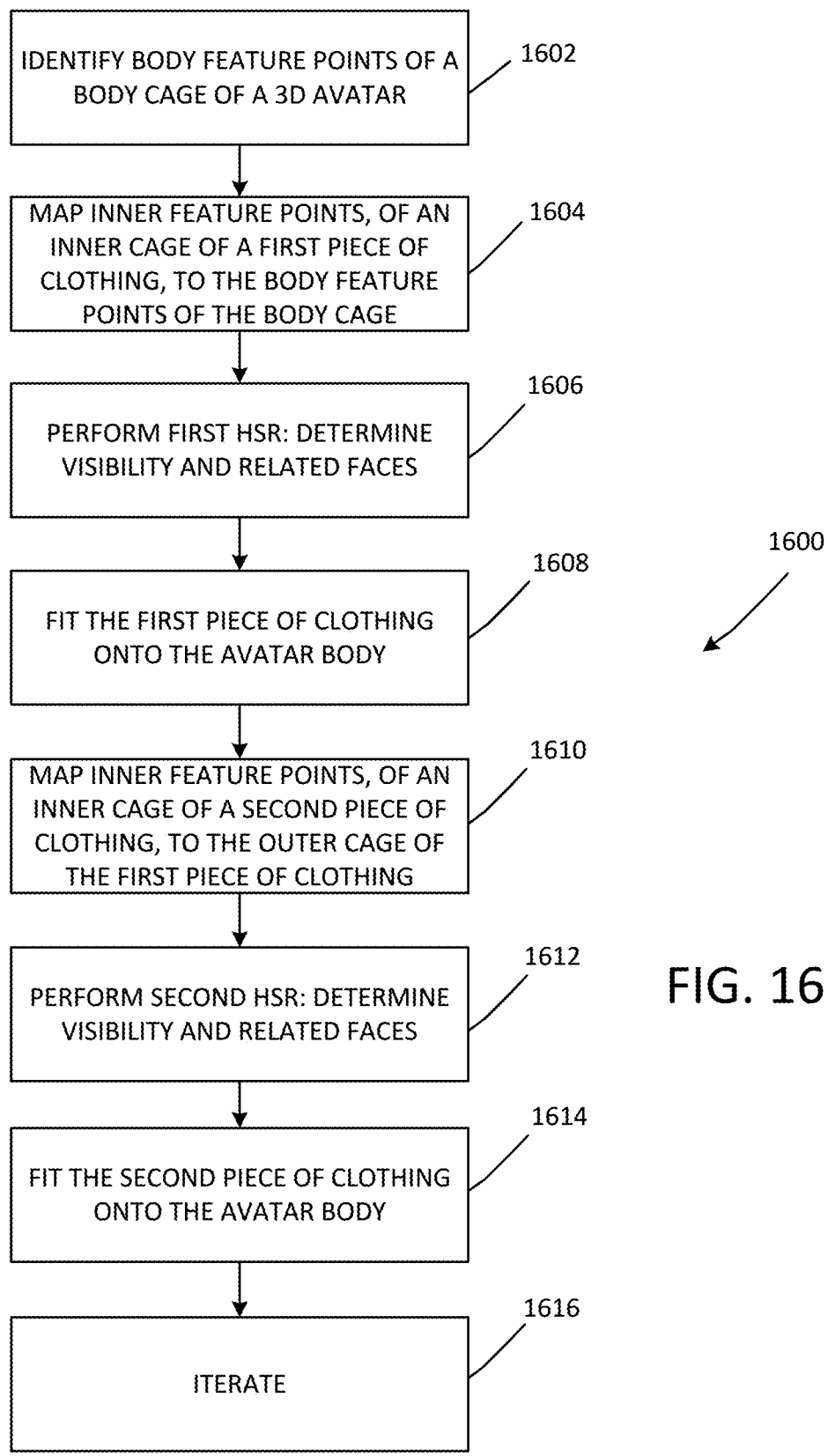
FIG. 16 is a flowchart illustrating a computer-implemented method to provide layered clothing with HSR on a 3D avatar, in accordance with some embodiments.

FIG. 16 is a flowchart illustrating a computer-implemented method 1600 to provide layered clothing with HSR on a 3D avatar, in accordance with some embodiments. For the sake of simplicity, the various operations in the method 1600 are described in the context of the game application 1512 at the client device 1510 performing the operations. However, and as previously described above with respect to FIG. 15, some of the operations may be performed alternatively or additionally, in whole or in part, by the game engine 1504 at the gaming platform 1502. The example method 1600 may include one or more operations illustrated by one or more blocks, such as blocks 1602 to 1616. The various blocks of the method 1616 and/or of any other process(es) described herein may be combined into fewer blocks, divided into additional blocks, supplemented with further blocks, and/or eliminated based upon the embodiment.

The method 1600 of FIG. 16 is explained herein with reference to the elements shown in FIGS. 1-15 and other figures. In one embodiment, the operations of the method 1600 may be performed in a pipelined sequential manner. In other embodiments, some operations may be performed out-of-order, in parallel, etc.

At a block 1602 ("IDENTIFY BODY FEATURE POINTS OF A BODY CAGE OF A 3D AVATAR"), the user has launched the game application 1512 and has accessed a library of avatar bodies to select an avatar to use in a 3D environment (such as an online game or virtual experience). The selected avatar may be a generic template with a general shape/size or may be a more detailed avatar template of a specific type (e.g., humanoid, alien, animal, etc.) with skinning. The avatar selected from the library may already have a body cage (see, e.g., FIGS. 1-3) configured thereon, and/or the game application 1512 may generate at least some of the body cage at runtime. The game application identifies the feature points of the body cage, which define the shape of the avatar. The block 1602 may be followed by a block 1604.

At the block 1604 ("MAP INNER FEATURE POINTS, OF AN INNER CAGE OF A FIRST PIECE OF CLOTHING, TO THE BODY FEATURE POINTS OF THE BODY CAGE"), user has accessed a library of clothing items and has selected a first piece of clothing. As with the avatar body at the block 1602, the first piece of clothing in the library may have cage(s) configured thereon, and/or the game application 1512 may generate at least some of the cage(s) at runtime. Such cages for the first piece of clothing include an inner cage and an outer cage (see, e.g., FIG. 7). At the block 1604, the game application 1512 may utilize a RBF technique to map the inner feature points, of the inner cage of the first piece of clothing, to the body feature points of the body cage, so as to deform the first piece of clothing (e.g., deform the mesh of the first piece of clothing) to conform to the avatar body. The block 1604 may be followed by a block 1606.

At the block 1606 ("PERFORM FIRST HSR: DETERMINE VISIBILITY AND RELATED FACES"), a first set of iterative HSR-related operations may be performed. For example, using the visibility technique of FIG. 10, the HSR method may determine whether a face of the body cage (corresponding to or otherwise acting as a proxy for a face of a body mesh) will be hidden by one or more faces of the mesh of the first piece of clothing. This determination is iteratively performed for each face of the body cage (or performed in parallel for various faces of the body cage), and the face of the body cage is marked as either visible or hidden (invisible), such as by setting vertices of the polygon as visible or invisible.

In some embodiments, a determination may also be made at the block 1606 as to which faces of the body cage are related to a particular face of the body mesh. This determination is analogous/similar to what is shown and described above with respect to FIGS. 13 and 14. In other embodiments, this relationship determination between body mesh faces and body cage faces need not be performed. The block 1606 may be followed by a block 1608.

At the block 1608 ("FIT THE FIRST PIECE OF CLOTHING ONTO THE AVATAR BODY"), the game application 1512 fits the first piece of clothing onto the avatar body. This fitting may be performed by the game application 1512 at the block 1608 by a rendering process that at least partially envelopes the avatar body with the deformed first piece of clothing. For instance, the coordinate positions of at least some of the inner feature points (of the inner cage of the first piece of clothing) assume the values of the coordinate positions of the body feature points of the body cage, when the clothing mesh of the deformed first piece of clothing is rendered on the avatar body.

As depicted by way of example in FIG. 11, the clothing mesh 1100 may thus be rendered on the avatar body and marked as visible, with the underlying hidden surfaces (shown in broken lines and previously marked/determined to be hidden) of the avatar body not being rendered. Also at the block 1606 and/or at the block 1608, a determination is made, for each face of the mesh of the first piece of clothing, as to which face(s) of the outer cage of the first piece of clothing are related to that face of the mesh of the first piece of clothing. This operation is described above with respect to FIGS. 12 and 13, and may involve (for example) adding the vertices of the related polygons of the outer cage to data of the corresponding face of the mesh of the first piece of clothing. The block 1608 may be followed by a block 1610.

At the block 1610 ("MAP INNER FEATURE POINTS, OF AN INNER CAGE OF A SECOND PIECE OF CLOTHING, TO OUTER FEATURE POINTS OF THE OUTER CAGE OF THE FIRST PIECE OF CLOTHING"), the user selects a second piece of clothing from the library (or a second piece of clothing may be selected automatically). Like the first piece of clothing at the block 1604, the second piece of clothing at the block 1610 has inner and outer cages. The game application 1512 maps the inner feature points (of the inner cage of the second piece of clothing) to the outer feature points of the outer cage of the deformed first piece of clothing that is already fitted onto the avatar body, so as to deform the second piece of clothing to conform to the avatar body having the first piece of clothing fitted thereon. The block 1610 may be followed by a block 1612.

At the block 1612 ("PERFORM SECOND HSR: DETERMINE VISIBILITY AND RELATED FACES"), a second set of iterative HSR-related operations may be performed. Again using the visibility technique of FIG. 10, the HSR method may determine whether a face of the outer cage (corresponding to or otherwise acting as a proxy for a face of the mesh of the first piece of clothing) will be hidden by one or more faces of the mesh of second first piece of clothing. This determination is iteratively/repeatedly performed for each face of the outer cage of the first piece of clothing, and the face of the mesh first piece of clothing is marked as either visible or hidden (invisible).

As explained above with respect to FIG. 14, the marking/identification, of a particular face of the mesh of the first piece of clothing, as being visible or invisible is based on the related faces of the outer cage of the first piece of clothing. If at least one of these related faces is determined to be visible through the second (next) piece of clothing, then the particular face of the mesh of the first piece of clothing is marked/identified as being visible. The block 1612 may be followed by a block 1614.

At the block 1614 ("FIT THE SECOND PIECE OF CLOTHING ONTO THE AVATAR BODY"), the game application 1512 fits the second piece of clothing onto the avatar body (which has the first piece of clothing already fitted thereon). This fitting may be performed by the game application 1512 at the block 1614 by a rendering process that at least partially envelops the avatar body (having the first piece of clothing already fitted thereon) with the deformed second piece of clothing. For instance, the coordinate positions of at least some of the inner feature points (of the inner cage of the second piece of clothing) assume the values of the coordinate positions of the outer feature points of the outer cage of the deformed first piece of clothing, when the clothing mesh of the deformed second piece of clothing is rendered over the avatar body having first piece of clothing fitted thereon.

The clothing mesh of the second piece of clothing may thus be rendered on the avatar body (having the first piece of clothing fitted thereon) and marked as visible, with the underlying hidden surfaces of the first piece of clothing and/or of the avatar not being rendered. Also, at the block 1612 and/or at the block 1614, a determination is made, for each face of the mesh of the second piece of clothing, as to which face(s) of the outer cage of the second piece of clothing are related to that face of the mesh of the second piece of clothing. As described above with respect to FIGS. 12 and 13, these related faces of the outer cage (of the second piece of clothing) may be used to determine whether the corresponding face, of the mesh of the second piece of clothing, will be visible when a third piece of clothing is layered on top of the second piece of clothing.

The block 1614 may be followed by a block 1616.

At the block 1616 ("ITERATE"), the operations analogous to those described above may be performed, so as to layer and deform additional piece(s) of clothing over the existing layer(s), with visibility determination and other HSR-related operations being performed when needed to preclude the rendering of hidden surfaces. For example, in a first iteration as described above with respect to blocks 1602-1608, a first clothing item is fitted (with HSR) over a body cage. In a second iteration that may be performed at the blocks 1610-1614, an additional (second) clothing item may be fitted (with HSR) over the first clothing item which is draped over the body cage. Iterations can be performed to fit additional clothing items for any number of items. In some embodiments (e.g., when clothing items in consecutive fittings relate to different, non-overlapping portions of the outer cage at that stage), fitting may be performed in parallel (e.g., fitting of hats may be performed concurrently with fitting of shoes, fitting of a shirt may be performed concurrently with fitting of pants, fitting of socks may be performed concurrently with fitting of gloves, etc.).

Figure 19:
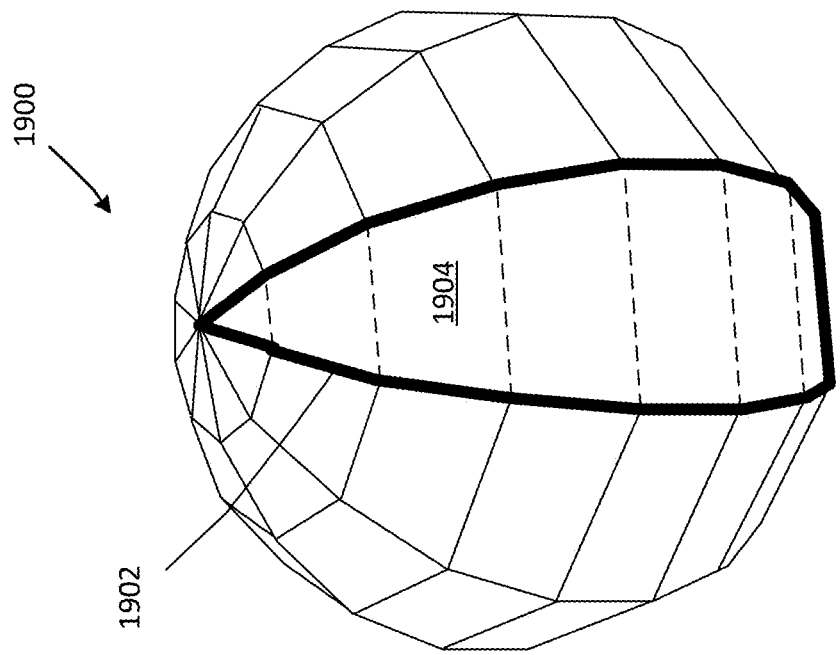
FIGS. 17-19 are diagrams pertaining to improving visibility determination for HSR, in accordance with some implementations.

Various enhancements can be made to the HSR techniques described above, so as to improve performance and results. For example, FIGS. 17-19 are diagrams pertaining to improving visibility determination for HSR, in accordance with some implementations.

Figure 17:
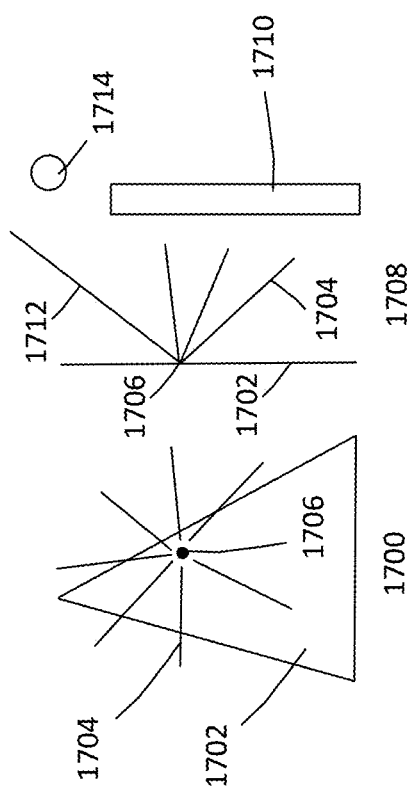

With reference first to FIG. 17 for context, a diagram 1700 shows a front view of a face 1702 of a polygon (e.g., a triangle) of a cage. In a manner similar to what is depicted in FIG. 10 above, a plurality of rays 1704 are shot from a sample point 1706 on the face 1702. A diagram (side view) 1708 shows that most/many of the rays 1704 hit/intersect a clothing mesh 1710. However, one ray 1712 misses the mesh 1710, thereby making the face 1702 visible to a viewer at position 1714. From the diagrams 1700 and 1708, it can therefore be concluded that the visibility of the face 1700 can be dependent upon either or both the position of the viewer and the origins and directions of the rays being shot.

Figure 18:
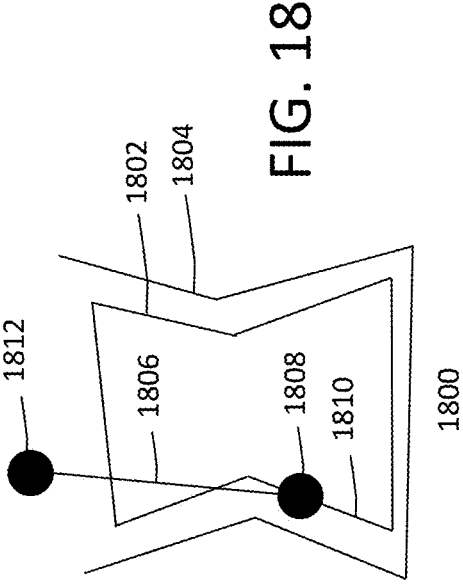

With reference next to FIG. 18, a diagram 1800 shows a cage 1802 and a clothing mesh 1804 that overlies some (but not all) portions of the cage 1802. As depicted in FIG. 18, a ray 1806 (shot from a point 1808 on a face 1810 of the cage 1802 towards a point 1812) may miss the clothing mesh 1804, but hits other face(s) of the cage 1802.

Ordinarily with the visibility determination technique of FIG. 10, the fact that the ray 1806 has missed the clothing mesh 1804 may cause the face 1810 to be deemed as visible. However, in some embodiments of the HSR technique, the visibility determination takes into consideration the ray 1806 hitting/intersecting other portions of the cage 1802. Thus, the face 1810 can be deemed to be invisible/hidden, rather than visible. The situation depicted in FIG. 18 may be applicable, for example, when one body part of an avatar is partially covered by another body part of the avatar, and there is an overlying piece of clothing having a gap located near the covered body part.

FIG. 19 pertains to improving visibility calculations by encoding the directions in which the rays are shot. For context, the visibility determination techniques described above involve shooting rays from faces of an underlying cage and detecting if these rays intersect/hit the mesh of the overlying piece of clothing. The rays may be shot from random directions, and if any of these rays miss the mesh of the overlying piece of clothing, then the face of the underlying cage is marked as visible.

However, and as an example, there may be situations when a region (e.g., a particular face amongst the plurality of faces of a body mesh) on an avatar body is visible when wearing only pants or visible when only wearing a shirt, but the face of the body mesh becomes hidden when wearing both the pants and the shirt. For instance: when the avatar body is wearing just the pants, the face of the body mesh is visible when looking down from the top; when wearing just the shirt, the of the body mesh is visible when looking up from the bottom; and when both the pants and shirt are worn, the face of the body mesh may thus be marked as visible, which would not be accurate. Therefore, an enhancement for the visibility determination of the HSR technique combines the visibility direction/determination for the pants and shirt, in such a manner that the face of the body mesh (and/or a face of an underlying clothing mesh) is determined to be hidden when both the pants and the shirt (or other pieces of clothing) are worn at the same time.

Such enhancement may be performed by encoding the ray directions of the visibility calculations, based on an example sphere 1900 shown in FIG. 19. The example sphere 1900 has been subdivided into 10 slices around its north-south axis, with an individual particular slice 1902 highlighted in FIG. 19. Each slice in turn has been subdivided into 10 regions 1904 along its height.

The sphere 1900 represents all possible ray directions, and each slice covers a predetermined range of directions that fall within the dihedral angel making up the slice. For instance, the slice 1902 may represent 10 different ray directions corresponding to each of the 10 regions 1904.

Each slice is encoded using a single bit value: value 0 for hidden, and value 1 for visible. Thus, for the slice 1902, there may be a string of 0s and 1s corresponding to the ray directions of the regions 1904. So, instead of shooting rays in random directions (such as depicted in FIG. 10), rays may be shot for each slice and visibilities are marked for the slice. The mesh of an inner cage can therefore be marked as visible from some directions and marked as hidden from other directions, all of which may be encoded into an array of 1s and 0s for each slice.

In the foregoing example of the avatar wearing just the pants, the body region/face can be marked as visible since the array for the slice 1902 will have at least one encoding direction value of 1 (visible). Analogously when the avatar wears just the shirt, the body region/face can be marked as visible since the array for the slice 1902 will also have at least one encoding direction value of 1 (visible). Then, when checking visibility on a multi-layered arrangement (e.g., wearing both the pants and the shirt), a logical AND operation can be performed on the encoded bit strings of the two slices. If the AND operation results in a value of 0, then the corresponding body region/face is marked as hidden. Otherwise, that body/mesh face is marked as visible, since the AND operation results in a value of 1.

According to various embodiments, further optimization of the technique of FIG. 19 can be performed. For example, visibility calculations can be optimized by shooting rays only for slices that can be visible, which can reduce computational cost. This may be done by first performing a dot product between the face's normal and the slice direction (e.g., from its middle point) and ignoring slices that are behind the face (e.g., a negative dot product value).

Figure 20:
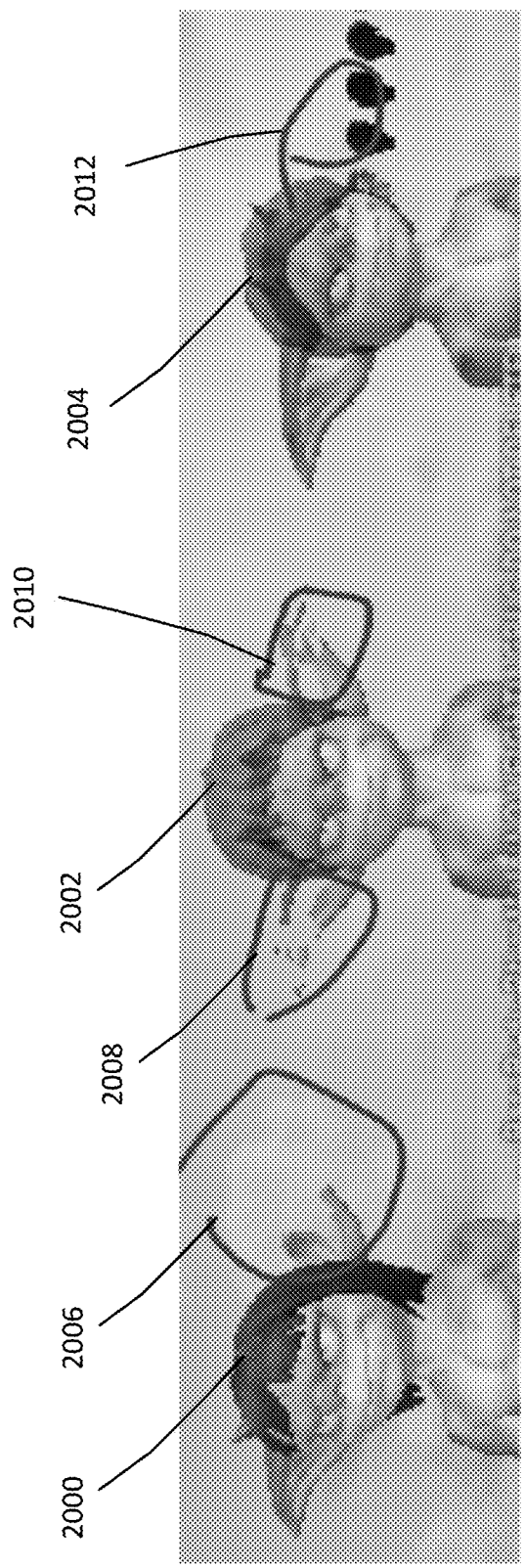
FIG. 20 shows an example a problem that may be encountered when performing HSR.

As yet another example of an enhancement of the HSR technique, reference is made next to FIG. 20. FIG. 20 shows an example a problem that may be encountered when performing HSR. Specifically, some faces of a body or clothing of avatars 2000-2004 may get removed when HSR is performed, even though such faces should not be removed, thereby leaving strange or unnatural looking results. In FIG. 20, parts of the avatar's ear have been removed while other parts of the same ear may (or may not) be rendered visible, such as shown at 2006-2012.

To address the problem depicted in FIG. 20, embodiments of the HSR technique may perform a clustering operation, in which faces that hide (or show) together are placed into a single group. An example of the clustering algorithm is as follows:

1. Calculate threshold:
   a. For each face on an outer cage (calculateCloseToCageThreshold)
      i. calculate a distance between the face on the outer cage and the closest face on the render mesh
   b. Get the middle value of the distance as the threshold value
2. Find all faces on render mesh that need to be cluster (meshFacesOutsideOfOuterCage)
   a. The algorithm only wants to cluster when the face on the render mesh is outside of the outer cage
   b. For each face on the render mesh:
      i. If the face's distance to the closest outer cage is larger than the threshold
      ii. AND when rays are shot from the face, at least one ray will not hit the outer cage,
      iii. Then the face needs to be clustered because it probably is outside of the outer cage
3. Group together those faces of the render mesh that are determined above to be outside of the outer cage (generateClusterForFacesOnMeshOutsideOfOuterCage)
   a. For each face on the render mesh that needs clustering:
      i. Find the face's adjacent faces on the render mesh
      ii. If the adjacent face(s) needs clustering, add the face(s) into one group
4. Update the map of the render mesh to the related outer cage:
   a. For each cluster of render faces:
      i. For each render face in the cluster:
         1. Find all the related outer cage faces
         2. Add these outer cage faces into a cluster of related outer cage faces
         3. Update the related outer cage face of all faces in the cluster of related outer cage faces to each render face in the cluster of render face cluster Next, when HSR is performed, all faces in a cluster are treated as one "big face" on the render mesh and share the same related faces on the outer cage. Accordingly, the clustered faces in the render mesh show or hide together.

In some scenarios, symmetry issues may be encountered when performing clustering. For example, an avatar may have two ears and hair. If the hair covers one ear but does not cover the other ear, then the avatar may be rendered with one ear being covered (hidden/removed). See, e.g., the avatar 2004 in FIG. 20.

As another example, clustering may be based on whether faces are connected or disconnected from each other. However, a problem with some avatars is that certain parts may appear to be connected but they are not, or certain parts are not intended to be connected but are still to hide or show together. A result of the HSR is that the rendered avatar may have "floating" disconnected parts or may have strangely/unnaturally attached parts.

As still examples: some faces may be too close to an outer cage, which may cause clustering that results in undue penetration/visibility of these faces, when in fact such faces are to be hidden; a threshold (see step 1 in the clustering algorithm above) may be set or calculated too large or too small; some faces may be fully covered but the user does not wish to hide these surfaces since these surfaces/parts may be special to the avatar; etc.

The above and other clustering issues are addressed in some embodiments by providing tools on a user interface (UI) to enable the user (e.g., a developer, creator, etc.) to select the faces to cluster together. For example, the user can: define which faces should always be visible for HSR: can paint with a color or otherwise identify faces to be hidden or shown, alternatively to identification using vertices; import meshes that define which faces are always visible or not visible; etc.

With respect to still another enhancement provided in some embodiments, HSR may be performed by shrinking the hidden areas (faces) of a cage. For context and as previously described above, HSR removes most polygons such as triangle (faces) that are covered by outer layers. However, some parts may not be removed, and these parts can thus cause undesirable bleeding manifested as penetration, clipping issues, non-fitting deformations, etc.

A solution to the foregoing problems is to shrink the hidden regions/faces of a cage, so that the faces/triangles of the mesh under these regions do not bleed. Ideally, triangles under hidden cage faces are removed by HSR, but some triangles may not be removed (e.g., due to such triangles being determined to be visible as a result of a ray escaping through a narrow gap between the mesh of the outer layer of clothing and the face of the underlying cage). By shrinking the underlying cage, the corresponding mesh under the cage is also shrunk, thereby reducing the bleeding problem.

When there is only a single layer of clothing, shrinking may be applied only to the underlying faces of the body. When there are two or more layers of clothing, the faces of each layer may be shrunken, except for the top-most layer.

This shrinking may be performed, going from the top (outermost) layer to a bottom (innermost) layer, until bleeding is eliminated or otherwise reduced to an acceptable level.

To perform the shrinking, a first operation may involve determining the triangles (faces) of the cage that are to be shrunken. To perform this determination, there may be a known triangle or at least one vertex of the triangle may be known. For example, if a triangle is known, the vertices of the triangle are known. Then, triangles adjacent to the known triangle can be determined as the triangles that share at least a subset of the known vertices. This process may iterate from one vertex/triangle to another, until all of the appropriate triangles to be shrunken are identified.

After the triangles are identified, using any appropriate method (including the process described above), shrinking of the triangles may be performed. According to various embodiments, an umbrella-Laplacian shrink technique and/or a normal shrink technique may be used.

A normal shrink technique moves vertices along the negative normal direction. Thus, a normal shrink may be used for an individual triangle lying on a single plane, for two or more triangles lying on a common plane, or for non-sharp feature vertices of a cage. However, a normal shrink technique may not work well with some sharp feature vertices, which can lead to bleeding.

Figure 21:
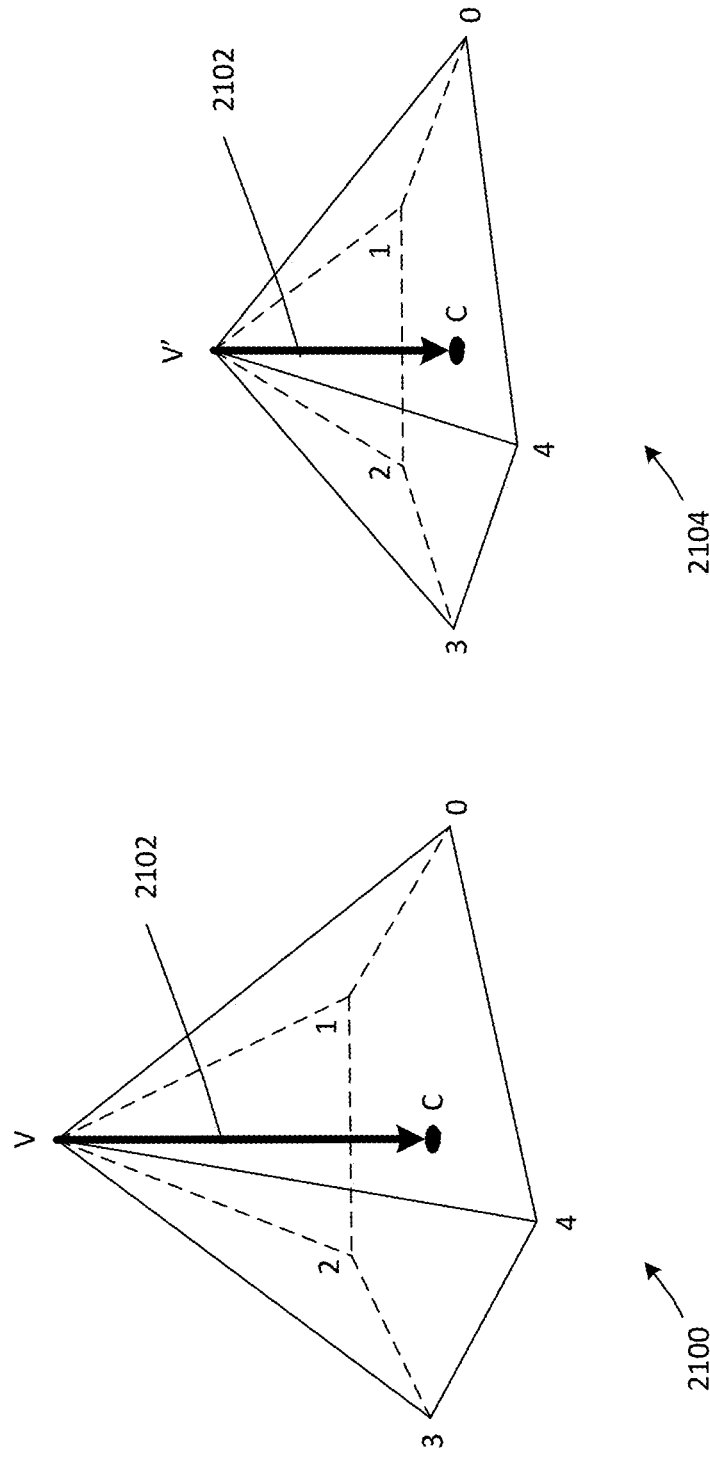
FIG. 21 shows an example of a hidden cage shrinking technique.

An umbrella-Laplacian shrink technique may be used to smooth the sharp features so as to reduce the chances of bleeding. FIG. 21 shows an example of a hidden cage shrinking technique, specifically an umbrella-Laplacian shrink technique.

A diagram 2100 shows a plurality of triangles having their tops joined together at a sharp vertex V. An umbrella operator is used to compute a vector 2102 from the vertex V to point C. Point C may be the average of neighbor vertices 0, 1, 2, 3, and 4.

If the vertex V is moved downwards by the umbrella operator to a vertex V' (as shown in a diagram 2104), the sharp feature provided by the vertex V is reduced. A similar operation can then be performed for all of the other vertices 0, 1, 2, 3, and 4 so as to obtain a shrunken cage/mesh. The umbrella-Laplacian shrink technique may also produce a smoothed cage/mesh.

According to some embodiments, the shrinking of the faces of the cage may be performed if the rendering shows that some bleeding has occurred. In other embodiments, shrinking may be performed prior to rendering, and then adjustments to the shrinking can be performed after this rendering, if there is bleeding or other undesirable visual effect that can be reduced by adjusting the shrinking.

Figure 22:
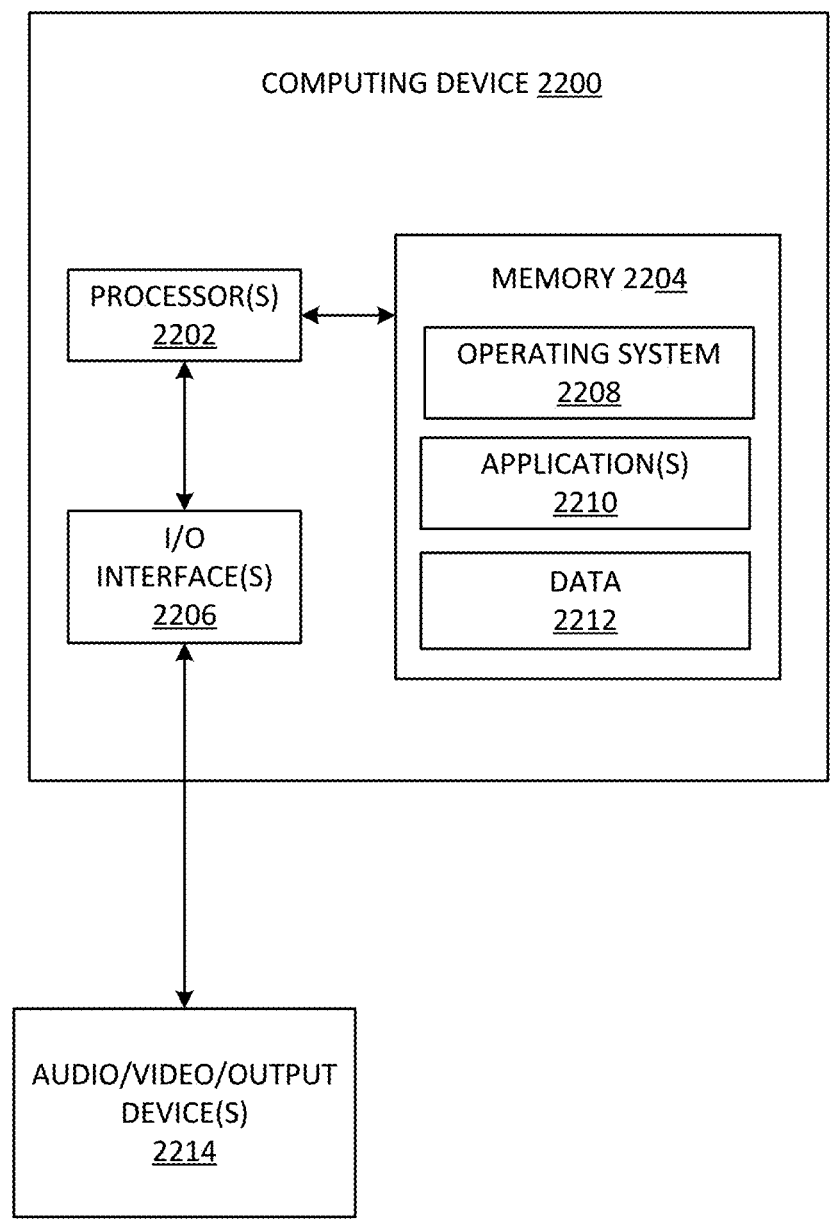
FIG. 22 is a block diagram illustrating an example computing device, in accordance with some embodiments.

FIG. 22 is a block diagram of an example computing device 2200 which may be used to implement one or more features described herein. The client devices 1510 and/or the gaming platform 1502 of FIG. 15 may be provided in the form of the computing device 2200 of FIG. 22. In one example, the computing device 2200 may be used to perform the methods described herein. The computing device 2200 can be any suitable computer system, server, or other electronic or hardware device. For example, the computing device 2200 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some embodiments, the computing device 2200 includes a processor 2202, a memory 2206, an input/output (I/O) interface 2206, and audio/video input/output devices 2214.

The processor 2202 can be one or more processors and/or processing circuits to execute program code and control basic operations of the computing device 2200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

The memory 2204 may be provided in the computing device 2200 for access by the processor 2202, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 2202 and/or integrated therewith. The memory 2204 can store software executable on the computing device 2200 by the processor 2202, including an operating system 2208, one or more applications 2210 and its related data 2212. The application 2210 is an example of a tool that can be used to embody the game applications 1512/1520 or the game engine 1504. In some embodiments, the application 2210 can include instructions that, in response to execution by the processor 2202, enable the processor 2202 to perform or control performance of the operations described herein with respect to deforming/fitting layered clothing over an avatar body and performing HSR-related operations.

Any of software in the memory 2204 can alternatively be stored on any other suitable storage location or computer-readable medium. In addition, memory 2204 (and/or other connected storage device(s)) can store instructions and data used in the features described herein. The memory 2204 and any other type of storage (magnetic disk, optical disk, magnetic tape, or other tangible media) can be considered "storage" or "storage devices."

The I/O interface 2206 can provide functions to enable interfacing the computing device 2200 with other systems and devices. For example, network communication devices, storage devices, and input/output devices can communicate with the computing device 2200 via an I/O interface 2206. In some embodiments, the I/O interface 2206 can connect to interface devices including input devices (keyboard, pointing device, touchscreen, microphone, camera, scanner, etc.) and/or output devices (display device, speaker devices, printer, motor, etc.), which are collectively shown as at least one audio/video input/output device 2214.

The audio/video input/output devices 2214 can include an audio input device (e.g., a microphone, etc.) that can be used to receive audio messages as input, an audio output device (e.g., speakers, headphones, etc.) and/or a display device, that can be used to provide graphical and visual output such as the example rendered 3D avatars with layered clothing described above.

For ease of illustration, FIG. 22 shows one block for each of processor 2202, memory 2204, I/O interface 2206, the application 2210, etc. These blocks may represent one or more processors or processing circuitries, operating systems, memories, I/O interfaces, applications, and/or software modules. In other embodiments, the computing device

2200 may not have all of the components shown and/or may have other elements including other types of elements instead of, or in addition to, those shown herein.

A user device can also implement and/or be used with features described herein. Example user devices can be computer devices including some similar components as the computing device 2200, e.g., processor(s) 2202, memory 2204, and I/O interface 2206. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 2214, for example, can be connected to (or included in) the computing device 2200 to display images pre- and post-processing as described herein, where such display device can include any suitable display device, e.g., an LCD, LED, or plasma display screen, CRT, television, monitor, touchscreen, 3-D display screen, projector, or other visual display device. Some embodiments can provide an audio output device, e.g., voice output or synthesis that speaks text.

One or more methods described herein (e.g., the method 1600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., field-programmable gate array (FPGA), complex programmable logic device), general purpose processors, graphics processors, application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular embodiments, these particular embodiments are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular embodiments. Different programming techniques may be employed, e.g., procedural or object-oriented. The routines may execute on a single processing device or multiple processors. Although the steps, operations, or computations may be presented in a specific order, the order may be changed in different particular embodiments. In some embodiments, multiple steps or operations shown as sequential in this specification may be performed at the same time.

What is claimed is:

1. A computer-implemented method to provide layered clothing on three-dimensional (3D) avatars, the method comprising:
   identifying body feature points of a body cage of a 3D avatar having an avatar body represented by a body mesh, wherein the body cage overlies the body mesh;
   mapping inner feature points, of an inner cage of a first piece of clothing, to the body feature points of the body cage to obtain a deformed first piece of clothing that conforms to the avatar body;
   performing first hidden surface removal (HSR) operations to identify faces of the body cage that are hidden by the deformed first piece of clothing;
   fitting the deformed first piece of clothing onto the avatar body by at least partially enveloping the avatar body with the deformed first piece of clothing, wherein faces of the avatar body that correspond to the identified faces of the body cage are not rendered;
   mapping inner feature points, of an inner cage of a second piece of clothing, to outer feature points of an outer cage of the deformed first piece of clothing to obtain a deformed second piece of clothing that conforms to the outer cage of the first piece of clothing;
   performing second HSR operations to identify faces of the outer cage of the deformed first piece of clothing that are hidden by the deformed second piece of clothing; and
   fitting the deformed second piece of clothing onto the avatar body by at least partially enveloping the avatar body, having the deformed first piece of clothing fitted thereon, with the deformed second piece of clothing, wherein faces of the deformed first piece of clothing that correspond to the identified faces of the outer cage are not rendered.

2. The method of claim 1, wherein performing the second HSR operations includes:
   for a first face, of a mesh of the deformed first piece of clothing, which is hidden, identifying at least a first face of the outer cage of the first piece of clothing that is related to the hidden first face of the deformed first piece of clothing; and
   for a second face, of the mesh of the deformed first piece of clothing, that is visible, identifying at least a second face of the outer cage of the first piece of clothing that is related to the visible second face of the deformed first piece of clothing, wherein the related at least the second face is used in a subsequent visibility determination with respect to a third piece of clothing, and wherein the related at least the first face is hidden with respect to the third piece of clothing.

3. The method of claim 1, wherein performing the second HSR operations to identify the faces of the outer cage of the deformed first piece of clothing that are hidden includes:
shooting a plurality of rays from at least one point on a face of the outer cage of the first piece of clothing;
determining the face to be visible if at least one ray of the plurality of rays misses the second piece of clothing; and
determining the face to be hidden if all of the plurality of rays hit the second piece of clothing.

4. The method of claim 1, wherein performing the first and second HSR operations includes:
with respect to the first piece of clothing, encoding first visibility of a particular face of the body cage using at least a first slice of a sphere;
with respect to the second piece of clothing, encoding second visibility of the particular face of the body cage using at least a second slice of the sphere; and
performing a logical operation between the encoded first visibility and the encoded second visibility to determine visibility of the particular face of the body cage when both the first and second pieces of clothing are fitted onto the avatar body.

5. The method of claim 1, wherein performing the first HSR operations includes performing a clustering technique so that first faces of the avatar body that hide together are clustered into a first group and second faces of the avatar body that show together are clustered into a second group.

6. The method of claim 1, further comprising shrinking at least one of the body cage and the outer cage of the first piece of clothing, wherein the shrinking reduces bleed through by an underlying face.

7. The method of claim 1, further comprising adjusting a puffiness caused by the deformed second piece of clothing being fitted over the deformed first piece of clothing.

8. A non-transitory computer-readable medium having instructions stored thereon that, responsive to execution by a processor, cause the processor to perform or control performance of operations to:
identify body feature points of a body cage of a 3D avatar having an avatar body represented by a body mesh, wherein the body cage overlies the body mesh;
map inner feature points, of an inner cage of a first piece of clothing, to the body feature points of the body cage to obtain a deformed first piece of clothing that conforms to the avatar body;
perform first hidden surface removal (HSR) operations to identify faces of the body cage that are hidden by the deformed first piece of clothing;
fit the deformed first piece of clothing onto the avatar body by at least partially enveloping the avatar body with the deformed first piece of clothing, wherein faces of the avatar body that correspond to the identified faces of the body cage are not rendered;
map inner feature points, of an inner cage of a second piece of clothing, to outer feature points of an outer cage of the deformed first piece of clothing to obtain a deformed second piece of clothing that conforms to the outer cage of the first piece of clothing;
perform second HSR operations to identify faces of the outer cage of the deformed first piece of clothing that are hidden by the deformed second piece of clothing; and
fit the deformed second piece of clothing onto the avatar body by at least partially enveloping the avatar body, having the deformed first piece of clothing fitted thereon, with the deformed second piece of clothing, wherein faces of the deformed first piece of clothing that correspond to the identified faces of the outer cage are not rendered.

9. The non-transitory computer-readable medium of claim 8, wherein the operations to perform the second HSR operations include operations to:
for a first face, of a mesh of the deformed first piece of clothing, that is hidden, identify at least a first face of the outer cage of the first piece of clothing that is related to the hidden first face of the deformed first piece of clothing; and
for a second face, of the mesh of the deformed first piece of clothing, that is visible, identify at least a second face of the outer cage of the first piece of clothing that is related to the visible second face of the deformed first piece of clothing,
wherein the related at least the second face is used in a subsequent visibility determination with respect to a third piece of clothing, and wherein the related at least the first face is hidden with respect to the third piece of clothing.

10. The non-transitory computer-readable medium of claim 8, wherein the operations to perform the second HSR operations, to identify the faces of the outer cage of the deformed first piece of clothing that are hidden, include operations to:
shoot a plurality of rays from at least one point on a face of the outer cage of the first piece of clothing;
determine the face to be visible if at least one ray of the plurality of rays misses the second piece of clothing; and
determine the face to be hidden if all of the plurality of rays hit the second piece of clothing.

11. The non-transitory computer-readable medium of claim 8, wherein the operations to perform the first and second HSR operations include operations to:
with respect to the first piece of clothing, encode first visibility of a particular face of the body cage using at least a first slice of a sphere;
with respect to the second piece of clothing, encode second visibility of the particular face of the body cage using at least a second slice of the sphere; and
perform a logical operation between the encoded first visibility and the encoded second visibility to determine visibility of the particular face of the body cage when both the first and second pieces of clothing are fitted onto the avatar body.

12. The non-transitory computer-readable medium of claim 8, wherein the operations to perform the first HSR operations includes operations to:
perform a clustering technique so that first faces of the avatar body that hide together are clustered into a first group and second faces of the avatar body that show together are clustered into a second group.

13. The non-transitory computer-readable medium of claim 8, wherein the instructions further cause the processor to perform operations to:

shrink at least one of the body cage and the outer cage of the first piece of clothing, wherein the shrinking reduces bleed through by an underlying face.

14. An apparatus, comprising:
   a processor; and
   a non-transitory computer-readable medium coupled to the processor and having instructions stored thereon that, responsive to execution by the processor, cause the processor to perform or control performance of operations to:
   identify body feature points of a body cage of a 3D avatar having an avatar body represented by a body mesh, wherein the body cage overlies the body mesh;
   map inner feature points, of an inner cage of a first piece of clothing, to the body feature points of the body cage to obtain a deformed first piece of clothing that conforms to the avatar body;
   perform first hidden surface removal (HSR) operations to identify faces of the body cage that are hidden by the deformed first piece of clothing;
   fit the deformed first piece of clothing onto the avatar body by at least partially enveloping the avatar body with the deformed first piece of clothing, wherein faces of the avatar body that correspond to the identified faces of the body cage are not rendered;
   map inner feature points, of an inner cage of a second piece of clothing, to outer feature points of an outer cage of the deformed first piece of clothing to obtain a deformed second piece of clothing that conforms to the outer cage of the first piece of clothing;
   perform second HSR operations to identify faces of the outer cage of the deformed first piece of clothing that are hidden by the deformed second piece of clothing; and
   fit the deformed second piece of clothing onto the avatar body by at least partially enveloping the avatar body, having the deformed first piece of clothing fitted thereon, with the deformed second piece of clothing, wherein faces of the deformed first piece of clothing that correspond to the identified faces of the outer cage are not rendered.

15. The apparatus of claim 14, wherein the operations to perform the second HSR operations include operations to:
   for a first face, of a mesh of the deformed first piece of clothing, that is hidden, identify at least a first face of the outer cage of the first piece of clothing that is related to the hidden first face of the deformed first piece of clothing; and
   for a second face, of the mesh of the deformed first piece of clothing, that is visible, identify at least a second face of the outer cage of the first piece of clothing that is related to the visible second face of the deformed first piece of clothing,
   wherein the related at least the second face is used in a subsequent visibility determination with respect to a third piece of clothing, and wherein the related at least the first face is hidden with respect to the third piece of clothing.

16. The apparatus of claim 14, wherein the operations to perform the second HSR operations, to identify the faces of the outer cage of the deformed first piece of clothing that are hidden, include operations to:
   shoot a plurality of rays from at least one point on a face of the outer cage of the first piece of clothing;
   determine the face to be visible if at least one ray of the plurality of rays misses the second piece of clothing; and
   determine the face to be hidden if all of the plurality of rays hit the second piece of clothing.

17. The apparatus of claim 14, wherein the operations to perform the first and second HSR operations include operations to:
   with respect to the first piece of clothing, encode first visibility of a particular face of the body cage using at least a first slice of a sphere;
   with respect to the second piece of clothing, encode second visibility of the particular face of the body cage using at least a second slice of the sphere; and
   perform a logical operation between the encoded first visibility and the encoded second visibility to determine visibility of the particular face of the body cage when both the first and second pieces of clothing are fitted onto the avatar body.

18. The apparatus of claim 14, wherein the operations to perform the first HSR operations includes operations to:
   perform a clustering technique so that first faces of the avatar body that hide together are clustered into a first group and second faces of the avatar body that show together are clustered into a second group.

19. The apparatus of claim 14, wherein the instructions further cause the processor to perform operations to:
   shrink at least one of the body cage and the outer cage of the first piece of clothing, wherein the shrinking reduces bleed through by an underlying face.

20. The apparatus of claim 14, wherein the instructions further cause the processor to perform operations to:
   adjust a puffiness caused by the deformed second piece of clothing being fitted over the deformed first piece of clothing.

* * * * *